United States Patent
Fortin et al.

(10) Patent No.: US 10,676,975 B2
(45) Date of Patent: *Jun. 9, 2020

(54) DOOR ASSEMBLY WITH COLLAPSIBLE CARRIER

(71) Applicant: Magna Closures Inc., Newmarket (CA)

(72) Inventors: Raymond Edward Fortin, Newmarket (CA); Eric V. Kalliomaki, Uxbridge (CA); Amandeep Kalra, Markham (CA)

(73) Assignee: MAGNA CLOSURES INC., New Market, Ontario (CA)

( * ) Notice: Subject to any disclaimer, the term of this patent is extended or adjusted under 35 U.S.C. 154(b) by 234 days.

This patent is subject to a terminal disclaimer.

(21) Appl. No.: 15/497,437

(22) Filed: Apr. 26, 2017

(65) Prior Publication Data
US 2017/0314306 A1  Nov. 2, 2017

Related U.S. Application Data

(60) Provisional application No. 62/329,241, filed on Apr. 29, 2016, provisional application No. 62/422,323, filed on Nov. 15, 2016.

(51) Int. Cl.
*E05D 15/16* (2006.01)
*B60J 5/04* (2006.01)
*B60J 1/17* (2006.01)

(52) U.S. Cl.
CPC ............. *E05D 15/165* (2013.01); *B60J 1/17* (2013.01); *B60J 5/0416* (2013.01); *B60J 5/0429* (2013.01); *B60J 5/0431* (2013.01); *B60J 5/0433* (2013.01); *B60J 5/0448* (2013.01); *E05Y 2900/531* (2013.01)

(58) Field of Classification Search
CPC ..... E05F 11/382; E05F 11/481; E05F 11/486; E05F 11/488; B60J 5/0444; B60J 5/0445; B60J 5/0463; B60J 5/0418; B60J 5/0419; B60J 5/0448; B60J 5/0416; B60J 5/0433; B60J 5/0431; B60J 5/0429; B60J 1/17; E05D 15/165

See application file for complete search history.

(56) References Cited

U.S. PATENT DOCUMENTS 1,699,560 A * 1/1929 Bourgon ................. B60J 5/0416
16/85
2,501,092 A * 3/1950 Rappl ........................ E05F 15/57
49/349

(Continued)

*Primary Examiner* — Katherine W Mitchell
*Assistant Examiner* — Abe Massad
(74) *Attorney, Agent, or Firm* — Dickinson Wright PLLC

(57) ABSTRACT

A door assembly for a motor vehicle comprised of an outer door panel and an inner door panel interconnected to define a door panel structure having an internal door cavity. A collapsible carrier module is configured to be oriented in a collapsed arrangement to facilitate installation into the door cavity through an opening in the inner door panel. The collapsible carrier module can be moved from its collapsed arrangement into an expanded arrangement upon installation within the door cavity to facilitate subsequent mounting to the door panel structure. The collapsible carrier module includes a two-piece carrier plate formed to integrally include a pair of laterally-spaced glass run channels and a pair of laterally-spaced slider rails.

11 Claims, 19 Drawing Sheets

(56) References Cited

U.S. PATENT DOCUMENTS

| | | | | |
|---|---|---|---|---|
| 5,062,240 | A | * | 11/1991 | Brusasco ............... B60J 5/0416 296/153 |
| 5,617,675 | A | * | 4/1997 | Kobrehel .............. E05F 11/485 49/352 |
| 5,946,858 | A | * | 9/1999 | Staser ................... E05F 11/488 49/139 |
| 6,134,840 | A | * | 10/2000 | Pleiss .................... B60J 5/0416 49/348 |
| 6,301,835 | B1 | * | 10/2001 | Pfeiffer ................. B60J 5/0416 296/146.5 |
| 6,615,475 | B2 | * | 9/2003 | Berta .................... B60J 5/0416 29/434 |
| 6,931,791 | B1 | * | 8/2005 | Pleiss .................... B60J 5/0416 49/352 |
| 7,607,716 | B2 | | 10/2009 | Buchta et al. |
| 7,877,932 | B2 | * | 2/2011 | Kriese ....................... B60J 1/17 49/348 |
| 8,020,919 | B2 | | 9/2011 | Lin et al. |
| 8,136,866 | B2 | | 3/2012 | Broadhead |
| 2003/0097797 | A1 | * | 5/2003 | Cucchiara ............. B60J 5/0416 49/502 |
| 2007/0163177 | A1 | * | 7/2007 | Heyer ................... B60J 5/0416 49/348 |

\* cited by examiner

DOOR ASSEMBLY WITH COLLAPSIBLE CARRIER

CROSS-REFERENCE TO RELATED APPLICATIONS

This application claims the benefit of U.S. Provisional Application No. 62/329,241 filed Apr. 29, 2016 and U.S. Provisional Application No. 62/422,323 filed Nov. 15, 2016. The entire disclosure of each of the above applications is incorporated herein by reference.

STATEMENT REGARDING FEDERALLY SPONSORED RESEARCH OR DEVELOPMENT

This invention was made with government support under DE-EE0007306 awarded by DOE. The government has certain rights in the invention.

FIELD

The present disclosure relates generally to vehicle door assemblies equipped with a carrier configured to hold various door hardware components. More particularly, the present disclosure relates to a collapsible carrier operable to move from a collapsed configuration for permitting installation into the vehicle door assembly into an expanded configuration following installation.

BACKGROUND

This section provides background information related to the present disclosure which is not necessarily prior art.

In many motor vehicle door assemblies, an outer sheet metal door panel and an inner sheet metal door panel are connected together to define an internal door cavity therebetween. An equipment module or sub-assembly, commonly referred to as a carrier, is often mounted to the inner door panel within the internal door cavity. In addition, an impact beam, also known as an intrusion beam, is typically welded to the inner door panel to resist deformation of the door assembly during a side impact collision. The use of carriers and side impact beams increase the thickness of the door assembly and can require pre-assembly to the inner door panel prior to its subsequent connection to the outer door panel. Specifically, the impact beam typically extends across an opening formed in the inner door panel that is used to install and mount the carrier to the inner door panel within the internal door cavity, and thus can interfere with the mounting of the carrier.

In view of the above, there is a need to provide a door assembly that provides required occupant protection while also being relatively simple to manufacture and assembly. Specifically, a need exists to advance the art in the arrangements and methods used for installing the carrier through the opening and subsequently mounting the carrier to the inner door panel within the internal door cavity.

SUMMARY

This section provides a general summary of the disclosure and is not intended to be considered a complete and comprehensive listing of the disclosure's full scope or all of its aspects, advantages, objectives and/or features.

In an aspect, the present disclosure is directed to a door assembly for a motor vehicle configured to include an outer panel, an inner panel, an intrusion member, and a carrier module. The outer panel and the inner panel, when connected together, form a door panel structure which is configured to define an internal door cavity. The intrusion member is disposed within the internal door cavity and its opposite ends are mounted to the door panel structure. The carrier module is configured to include a plurality of door hardware components. A feature of the present disclosure is directed to the carrier module having a carrier plate that is "collapsible" to facilitate installation into the internal door cavity through an opening formed in the inner panel. In particular, the carrier plate associated with the collapsible carrier module is configured to move from a pre-installed or "collapsed" configuration to a post-installed or "expanded" configuration. The collapsed configuration is provided to permit installation of the carrier module through the opening in the inner door panel. Following installation into the door cavity, the carrier plate of the collapsible carrier module is moved into its expanded configuration and subsequently attached to structural portions of the inner door panel and/or other portions of the door panel structure.

By providing a collapsible carrier module, the carrier module of the present disclosure can be mounted in the door panel structure relatively easily because the installer does not need to maneuver the carrier plate and the door hardware components mounted thereto around the intrusion member.

In one non-limiting embodiment of the collapsible carrier module, the carrier plate is formed to include two glass run channels. This is an advancement over conventional carriers of the type installed through an opening in the inner door panel and which only include one glass run channel. Additionally, the carrier plate may also be formed to include two slide rails configured to support the laterally-spaced window lifter plates associated with the window regulator.

In another non-limiting embodiment, the collapsible carrier module includes a carrier plate having a first carrier member formed with an integral first glass run channel, a second carrier member formed with an integral second glass run channel, and a locking mechanism. The first and second carrier members are interconnected via a connection mechanism configured to permit relative axial movement between the carrier members between a first or retracted position and a second or extended position. The retracted position between the first and second carrier members establishes the collapsed configuration of the carrier module, while the extended position between the first and second carrier members establishes the expanded configuration of the carrier module. The locking mechanism functions, in cooperation with the connection mechanism, to permit relative translational movement between the first and second carrier members from the retracted position into the extended position and subsequently functions to rigidly hold the carrier members in the extended position.

In accordance with a revised version of the above-noted embodiment, the second carrier member of the carrier plate may further include a hinged connection mechanism between a base segment and the second glass run channel so as to permit the second glass run channel to pivot between a first or closed position relative to the base segment and a second or open position relative to the base segment. A second locking mechanism permits movement of the second glass run channel from its closed position during installation of the carrier module through the opening in the inner door panel into its open position following installation of the carrier module into the internal door cavity, and further functions to rigidly latch the second glass run channel in its open position.

In another non-limiting embodiment, the collapsible carrier module includes a carrier plate having a first carrier member formed with an integral first glass run channel, a second carrier member formed with an integral second glass run channel, a pivot-type or hinge-type connection mechanism coupling the second carrier member to the first carrier member, and a locking mechanism. The second carrier member is pivotably moveable relative to the first carrier member between a first or closed position and a second or open position. The closed position establishes the collapsed configuration of the carrier module while the open position establishes the expanded configuration thereof. The locking mechanism functions to permit movement of the second carrier member about the pivot/hinge connection mechanism from its closed position to its open position, and further functions to rigidly latch the second carrier member in its open position.

In another non-limiting embodiment, the collapsible carrier module includes a two-piece carrier plate having a first carrier plate and a second carrier plate moveable relative to the first carrier plate between a first position to define a pre-assembly configuration and a second position to define a post-assembly configuration. The first carrier member includes a first rail segment defining a first glass run channel and a first slider rail configured to support a first window lifter plate. The second carrier member includes a second rail segment defining a second glass run channel and a second slider rail configured to support a second window lifter plate. A window is disposed within the first and second glass run channels for movement between open and closed positions. The integration of the first and second slider rails with the first and second glass run channels eliminates the need to provide independent window guide rails so as to reduce the complexity of the collapsible carrier module.

Further areas of applicability will become apparent from the description provided herein. The description and specific examples in this summary are only intended to illustrate certain non-limiting embodiments which are not intended to limit the scope of the present disclosure.

DRAWINGS

The drawings described herein are for illustrative purposes only of selected non-limiting embodiments and are not intended to limit the scope of the present disclosure. In this regard the drawings include:

Corresponding reference numerals indicate corresponding parts throughout the several views shown in the drawings.

DETAILED DESCRIPTION

The following is a detailed description of example embodiments of a collapsible carrier module of the type configured to be installed within an internal door cavity of a motor vehicle door assembly. Each of the example embodiments of the collapsible carrier module includes a two-member carrier plate configured to provide a pre-installed/collapsed arrangement and a post-installed/assembled arrangement. These example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
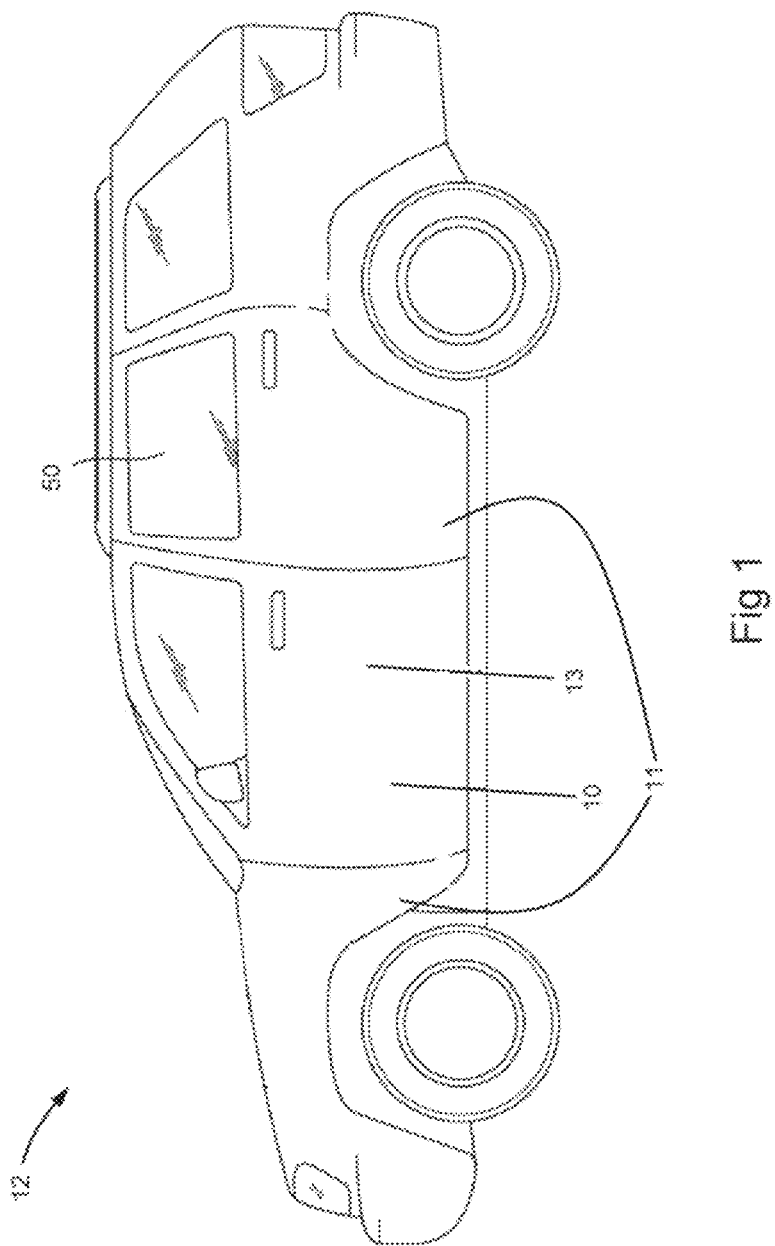
FIG. 1 illustrates a motor vehicle with a door assembly.

Reference is made to FIG. 1, which shows a door assembly 10 mounted to a body 11 of a motor vehicle 12. The door assembly 10 includes an outer panel 13, an inner panel 14 (FIG. 2), and a carrier/intrusion member assembly 16. The production of the door assembly 10 is facilitated directly as a result of the carrier/intrusion member assembly 16.

Figure 3:
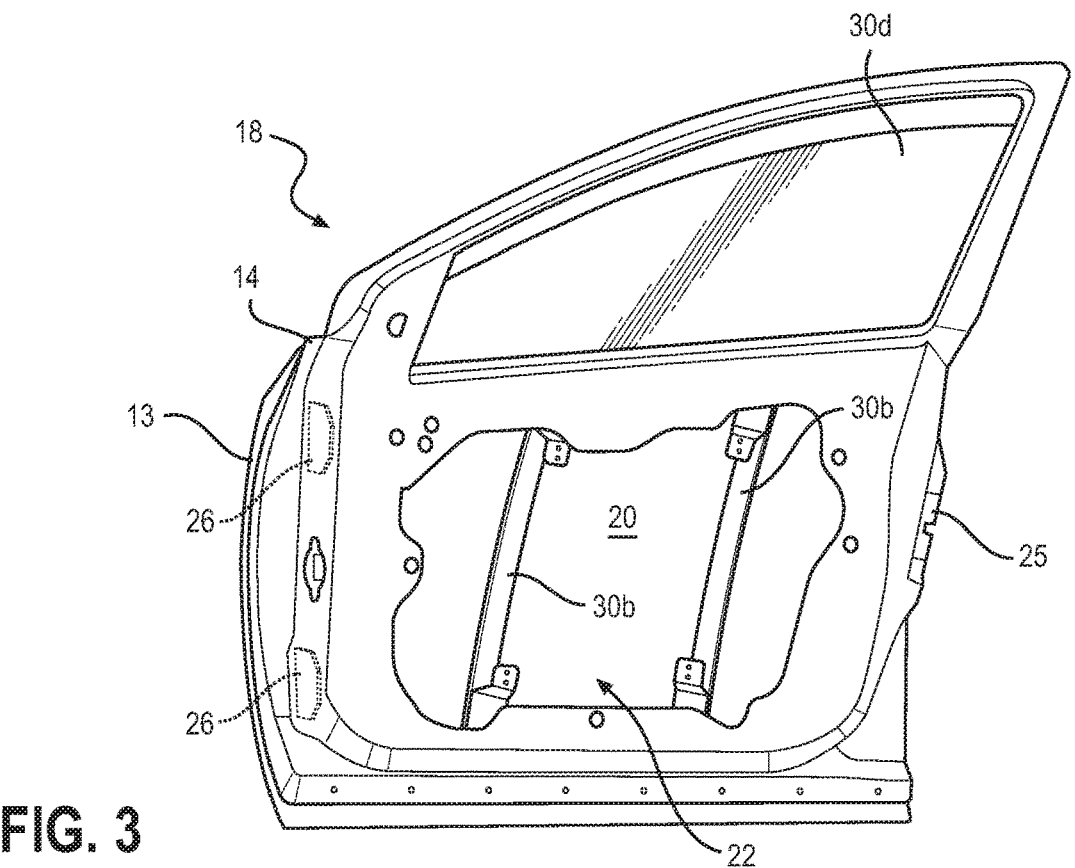
FIG. 3 is a perspective view of a door panel structure that is part of the door assembly shown in FIG. 2.

The outer panel 13 forms at least part of the exterior surface of the door assembly 10. The inner panel 14 provides a structural member for the mounting of one or more trim pieces that form an inner surface of the door assembly 10. Some of the inner panel 14 may itself also form part of the inner surface of the door assembly 10. The inner and outer panels are connected together and together form a door panel structure 18 that contains an internal door cavity 20 (FIG. 3). An opening 22 in the door panel structure 18 provides access to the internal door cavity 20.

The outer and inner panels 13 and 14 may be made from any suitable material or combination of materials. For example, the outer and inner panels 13 and 14 may both be made from a suitable metal (e.g. a suitable steel). In another example, the outer panel 13 may be made from a suitable polymeric or composite material (e.g. fiberglass) and the inner panel may be made from a suitable metal.

Figure 5A:
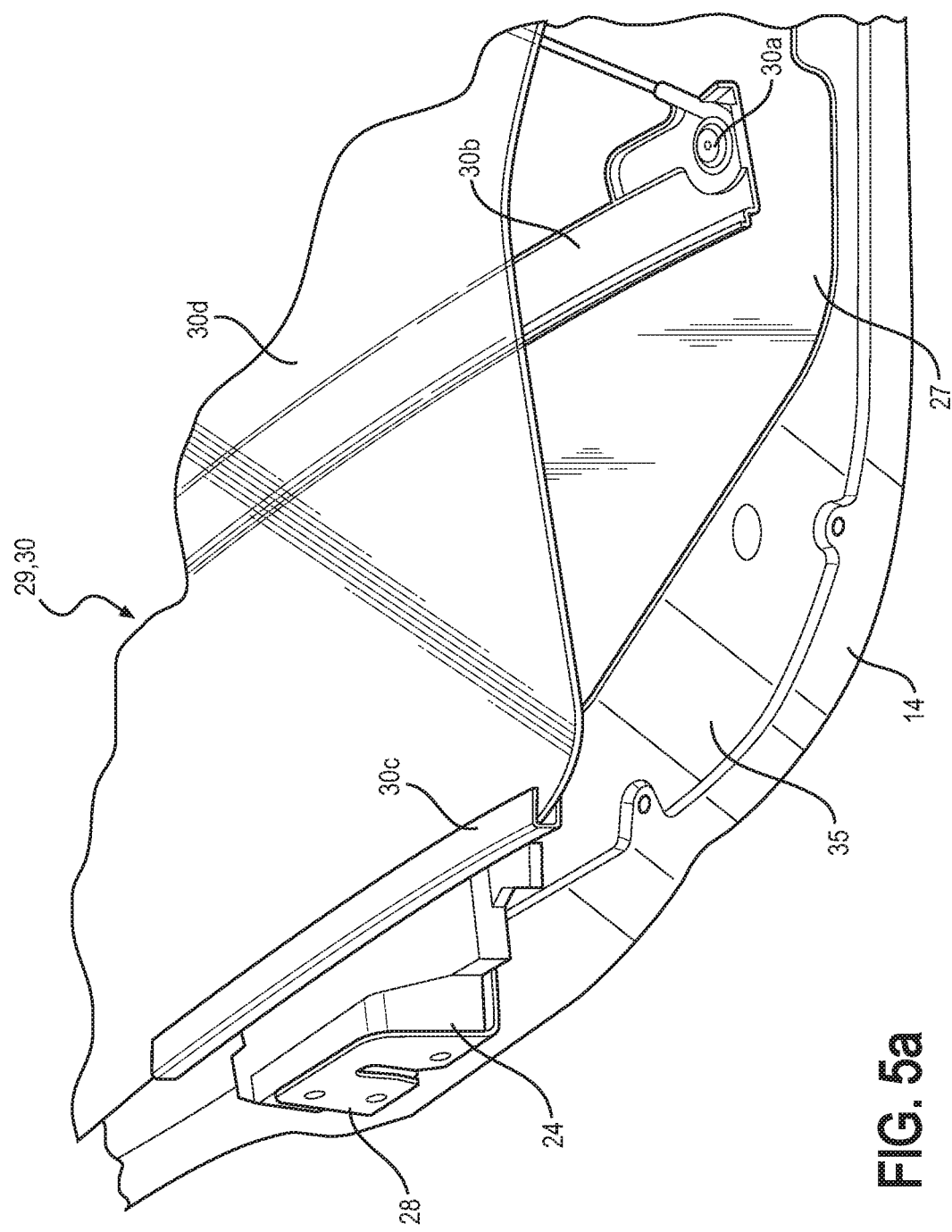
FIG. 5a is a perspective view of a portion of the door assembly shown in FIG. 2.
Figure 5B:
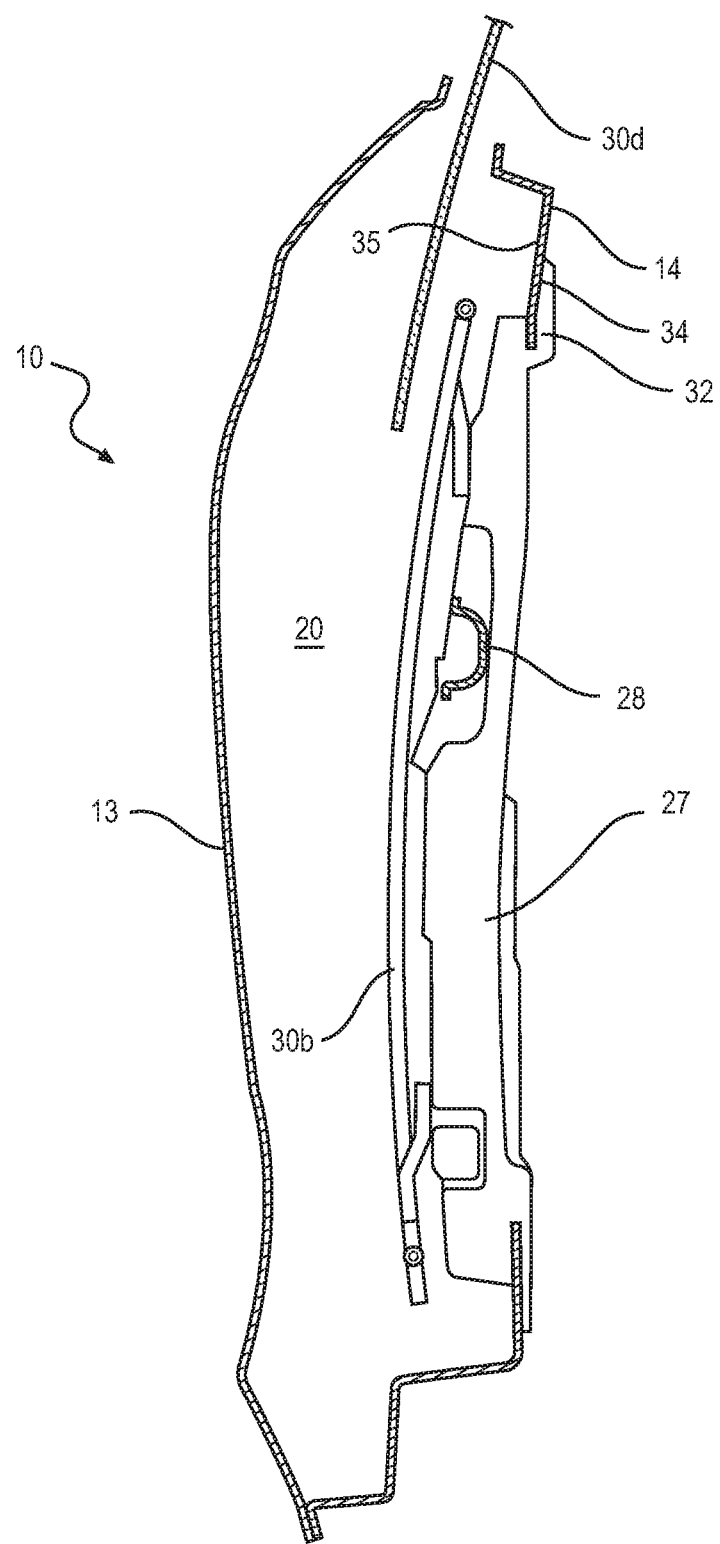
FIG. 5b is a sectional end view of the door assembly shown in FIG. 2.
Figure 5C:
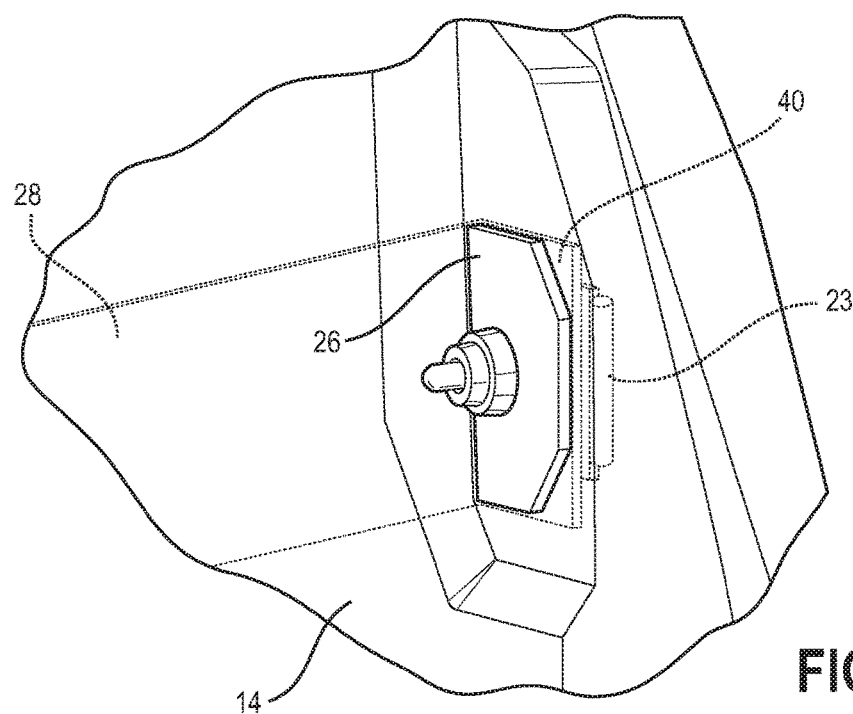
FIG. 5c is a magnified perspective view of a portion of the door assembly shown in FIG. 2.

A pair of hinges 23 (one of which is shown in FIG. 5c) are connected to the door panel structure 18 and pivotally mount the front end of the door panel structure 18 (and the door assembly 10) to the vehicle body 11. A door latch 24 (FIG. 2) is mounted to the rear end of the door panel structure 18 to permit the releasable closure of the door assembly 10 against the vehicle body 11. The hinges 23 and the door latch 24 acts as force transfer members through which forces in the door assembly 10 are transmitted to the vehicle 11. Such forces include, for example, side-impact forces from a vehicle colliding with the vehicle 12.

Referring to FIG. 3, at least one of the outer and inner panels 13 and 14 includes a latch reinforcement structure 25 that engages the door latch 24 and transmits forces in the door panel structure 18 thereto for transmission out of the door assembly 10 and into the vehicle body 11. The latch reinforcement structure 25 may simply be made up of a relatively thick metal plate that supports the door latch 24. Similarly, at least one of the outer and inner panels 13 and 14 includes a hinge reinforcement structure 26 that engages the hinges 23 and transmits forces in the door panel structure 18 thereto for transmission out of the door assembly 10 and into the vehicle body 11. The hinge reinforcement structure 26 may simply be made up of one or more relatively thick metal plates that support the hinges 23. Thus, side impact forces incurred by the door assembly 10 can be transferred to the vehicle body 11 through the door latch 24 and the hinges 23.

Figure 4A:
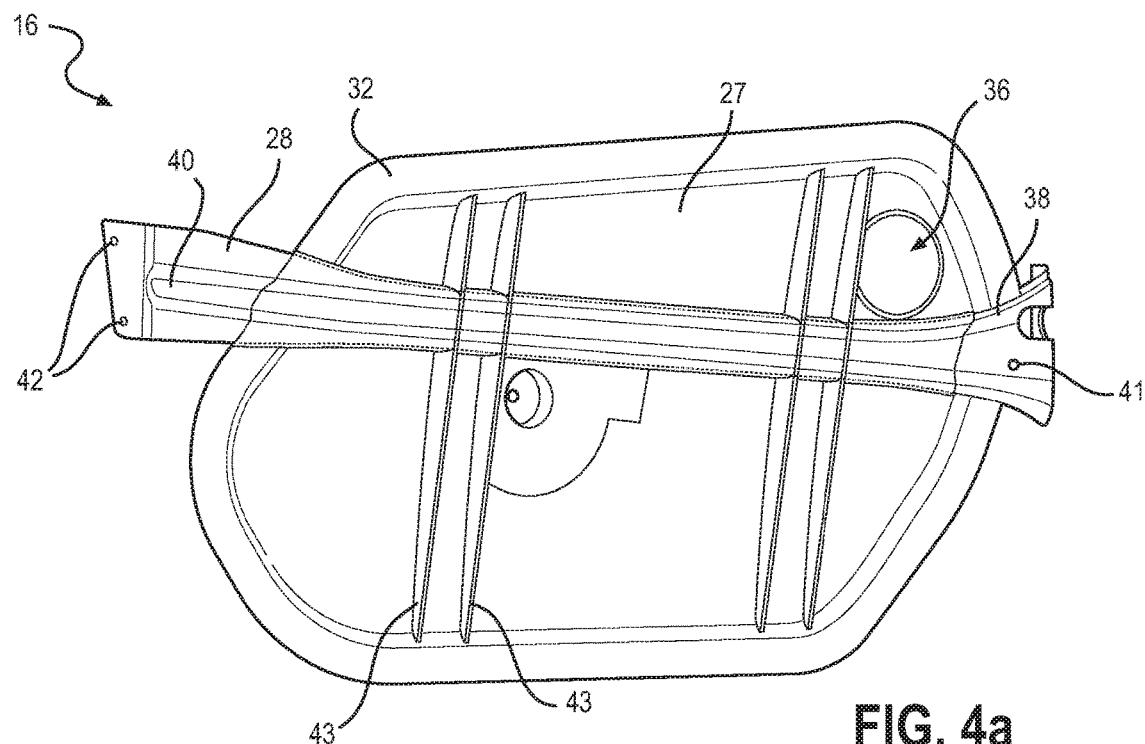
FIGS. 4a and 4b illustrate a carrier/intrusion member assembly that is part of the door assembly shown in FIG. 2.
Figure 4B:
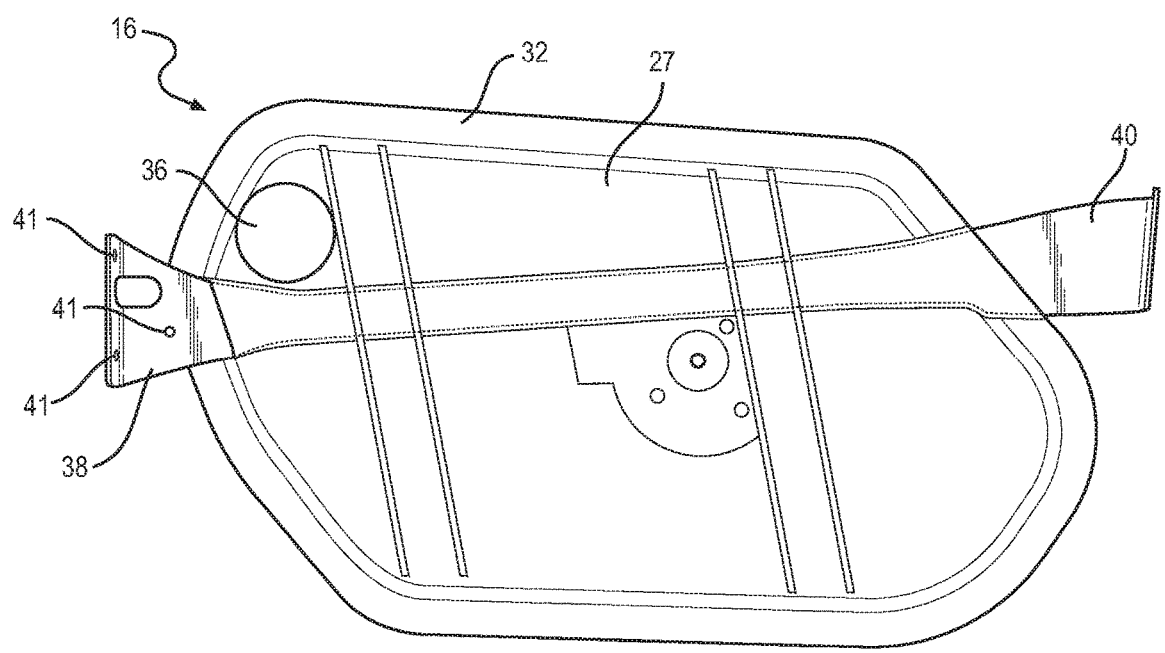

The carrier/intrusion member assembly 16 includes a carrier 27 (FIGS. 4a and 4b), an intrusion member 28 and a plurality of door hardware components 29 (FIG. 5a) including, for example, components from a window regulator shown at 30 (e.g. a motor driven cable drum (not shown), pulleys and cable guides (shown at 30a), lifter plates (not shown), window regulator rails (shown at 30b), and glass run channels (shown at 30c) for guiding the window (shown at 30d)). Other door hardware components 29 may include, for example, a speaker (not shown) for outputting sound from the vehicle's stereo system (not shown). The positions of the window regulator rails 30b are shown in FIG. 3 also.

Figure 2:
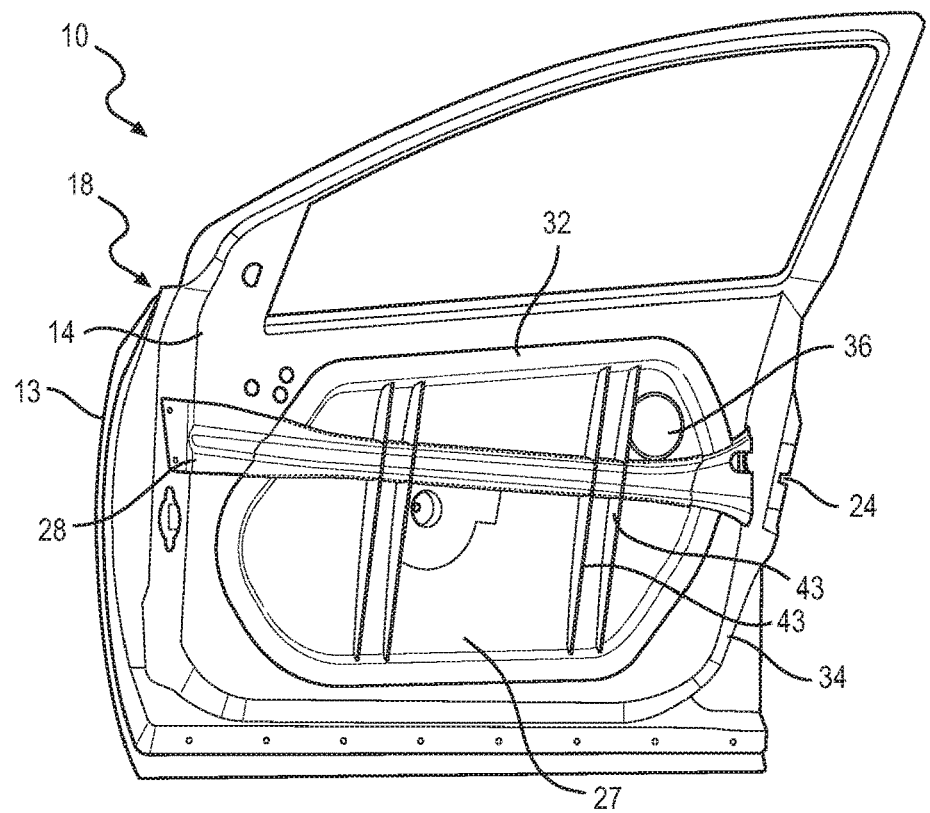
FIG. 2 is a perspective view of the door assembly shown in FIG. 1.

Referring to FIG. 5a, the carrier 27 is a one-piece plate or panel that holds a plurality of the aforementioned door hardware components 29 and is installing in position on the door panel structure 18 so that all of the attached door hardware components 29 are automatically in their necessary positions for operation. The carrier 27 may be made from a polymeric material or a metallic material. The carrier 27 mounts to the door panel structure 18 in such a way that the door hardware components 28 extend through the opening 22 in the door panel structure 18 into the internal door cavity 20. Referring to FIG. 2, the carrier 27 has a peripheral edge 32 that sealingly engages the inner panel 14 to prevent the leakage of moisture therepast. In the embodiment shown, the peripheral edge 32 engages the inner face of the inner panel 14, (shown at 34 in FIG. 5b), however it will be understood that the carrier 27 could alternatively mount entirely or partially to the outer face of the inner panel 14 (shown at 35 in FIG. 5b).

Referring to FIG. 2, the carrier 27 includes an access aperture 36 that permits access to the components 28 in the internal door cavity 20 after the carrier 27 has been mounted to the door panel structure 18. After installation of components in the internal door cavity 20 is complete, the access aperture 36 may be closed by some suitable member to prevent moisture from leaking therepast.

The intrusion member 28 is a member that strengthens the door assembly 10, and in particular increases the resistance of the door assembly 10 to intrusion into the vehicle cabin from a side-impact (e.g. from another vehicle colliding with the vehicle 12). The intrusion member 28 may be made from any suitable material, such as a suitable metallic material.

The intrusion member 28 has a first end 38 and a second end 40. In the embodiment shown, the first and second ends 38 and 40 of the intrusion member 28 extend past the peripheral edge of the carrier 32, thereby facilitating the mounting of the intrusion member 28 directly to the door panel structure 18. This permits the intrusion member 28 to better assist the door assembly 10 in resisting deformation inwards from a side impact than if the intrusion member 28 were simply mounted to the carrier 27 only and not directly to the door panel structure 18.

In a particularly advantageous embodiment, shown in FIGS. 5a, 5b and 5c, the first and second ends 38 and 40 of the intrusion member 28 have first and second mounting features 41 and 42 at the first and second ends 38 and 40 are connected to (and thus engage) the latch reinforcement structure 25 and the hinge reinforcement structure 26 respectively. For this reason, the first end 38 of the intrusion member 28 may be referred to as a hinge end 38 in some embodiments, and the second end 40 may be referred to as a latch end in some embodiments. The first and second mounting features 41 and 42 may comprise one or more apertures for the pass-through of mechanical fasteners, side edge surfaces that are used for welding, a bottom surface that is used for bonding, or any other type of feature. As a result of being engaged with the latch reinforcement structure 25 and the hinge reinforcement structure 26, the intrusion member 28 transmits side-impact forces incurred by the door assembly 10 to them and therefore out of the door assembly 10 into the vehicle body 11 through them. As a result, the vehicle body 11 itself assists in resisting deformation of the door assembly 10 from a side impact.

The connection between the first and second ends 38 and 40 of the intrusion member 28 and the latch reinforcement structure 25 and the hinge reinforcement structure 26 may be by any suitable means, such as by welding, bonding, and/or by mechanical fasteners.

From an ease-of-assembly point of view, however, by providing the carrier/intrusion member assembly 16 (i.e. by providing the intrusion member 28 with the carrier 27), the installation of the carrier 27 with all of the door hardware components 29 mounted thereto is facilitated as compared to some prior art door assemblies in which the carrier assembly with the door hardware components must be installed onto a door panel structure with an intrusion member already connected to the door panel structure. It can be difficult to maneuver the carrier assembly into place without interference occurring between a pre-installed intrusion member and the door hardware components (which can in some circumstances damage some of the door hardware components).

While the carrier 27 itself mounts to the door panel structure 18 in the embodiments shown herein, it is possible in an alternative embodiment for the carrier 27 to be sufficiently solidly connected to the intrusion member 28 and to not require direct mounting to the door panel structure 18.

The connection between the carrier 27 and the intrusion member 28 may be by any suitable means. For example, in the embodiment shown in FIGS. 4a and 4b the carrier 27 is overmolded on the intrusion member 28.

By virtue of a rigid connection between the carrier 27 and the intrusion member, as is provided by overmolding, the intrusion member 28 can add rigidity to the carrier 27, so that the carrier 27 can better act as a structural component of the door assembly 10 so as to help inhibit door sag and the like.

To assist in the transfer of forces between the carrier 27 and the intrusion member 28, there may be provided a set of strengthening ribs 43 molded into the carrier 27 that extend across the intrusion member 28.

Figure 6:
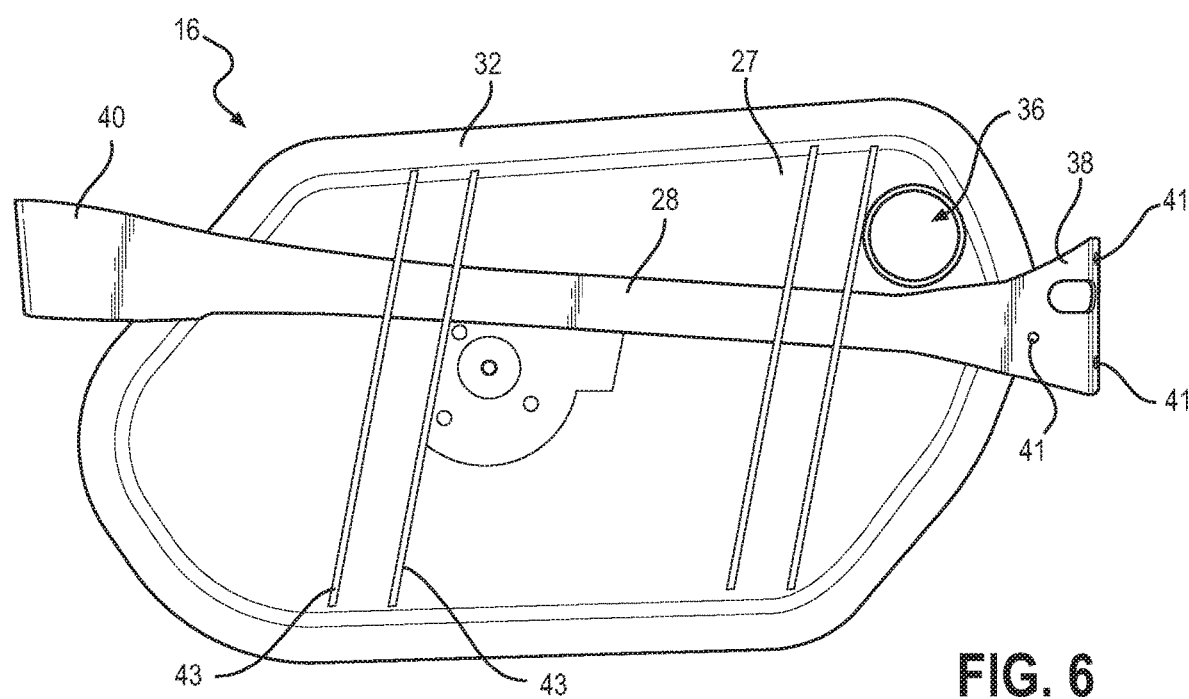
FIG. 6 is a side view of a variant of the carrier/intrusion member assembly shown in FIGS. 4a and 4b.

In other embodiments, the intrusion member 28 may connect to the carrier 27 in other ways. For example, as shown in FIG. 6, the carrier 27 may include preformed slots in the strengthening ribs 43, which permit the pass-through (e.g. from left to right), so as to loosely connect the intrusion member 28 to the carrier 27.

Figure 7:
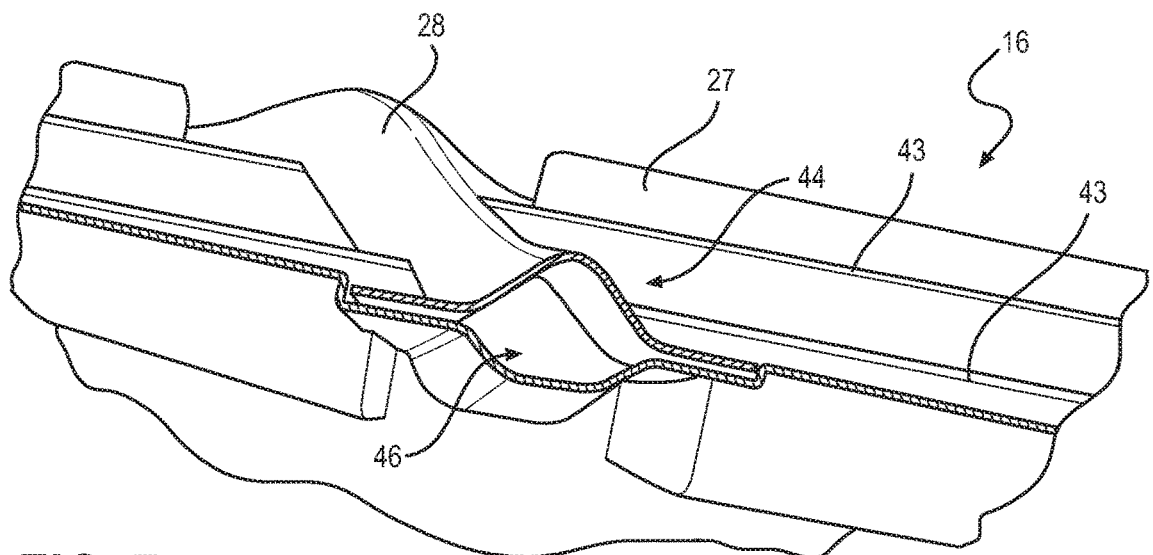
FIG. 7 is a side view of another variant of the carrier/intrusion member assembly shown in FIGS. 4a and 4b.

In yet another embodiment, the intrusion member 28 may connect to the carrier 27 by a snap-fit connection, such as is shown in FIG. 7.

In some embodiments, such as the embodiment shown in FIG. 7, the intrusion member 28 may cooperate with the carrier 27 to form a hollow structure 44 that contains a carrier/intrusion member cavity 46. By forming a hollow structure, particularly when the carrier 27 and the intrusion member 28 are connected fixedly enough to be able to transmit bending stresses to one another, the resistance to deformation of the hollow structure can be significantly higher than if the carrier 27 and intrusion member 28 are connected with no hollow structure formed therebetween.

Figure 8:
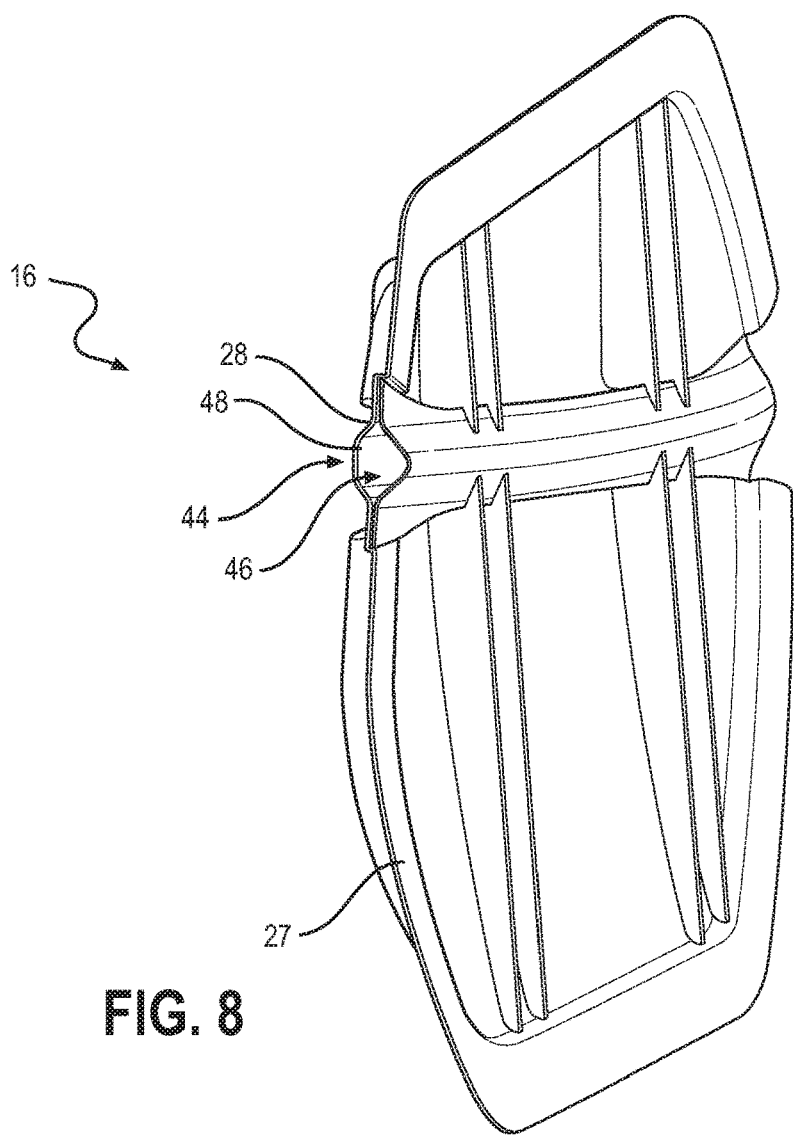
FIG. 8 is an end view of the carrier/intrusion member assembly shown in FIG. 7, showing the optional use of an energy absorption member.

Optionally, as shown in FIG. 8, the carrier/intrusion member cavity 46 may contain (and is preferably substantially filled with) an energy absorption material 48. The energy absorption material may be any suitable type of material. For example, it may be aluminum foam, or alternatively magnesium foam or a polymeric foam. The term aluminum is meant to include both pure aluminum and aluminum alloys. Similarly, the term magnesium is intended to include both pure magnesium and magnesium alloys.

The energy absorption material 48 may be provided initially in the form of a solid, preformed member. In embodiments wherein the carrier 27 is preformed and then connected to the intrusion member 28, the solid preformed member made up of energy absorption material 48 can be inserted between the carrier 27 and the intrusion member 28 as they are being joined together. Alternatively, the energy absorption material 48 may be provided initially in the form of a flowable (e.g. molten) material that may be injected into the cavity 46 and which may be hardened, by any suitable means thereafter (e.g. by simply allowing it to cool). The energy absorption material acts to further dissipate energy from a side-impact thereby further reducing the degree of intrusion into the passenger compartment of the vehicle 12 that might occur from a side-impact. The passenger compartment is shown at 50 in FIG. 1.

Figure 9:
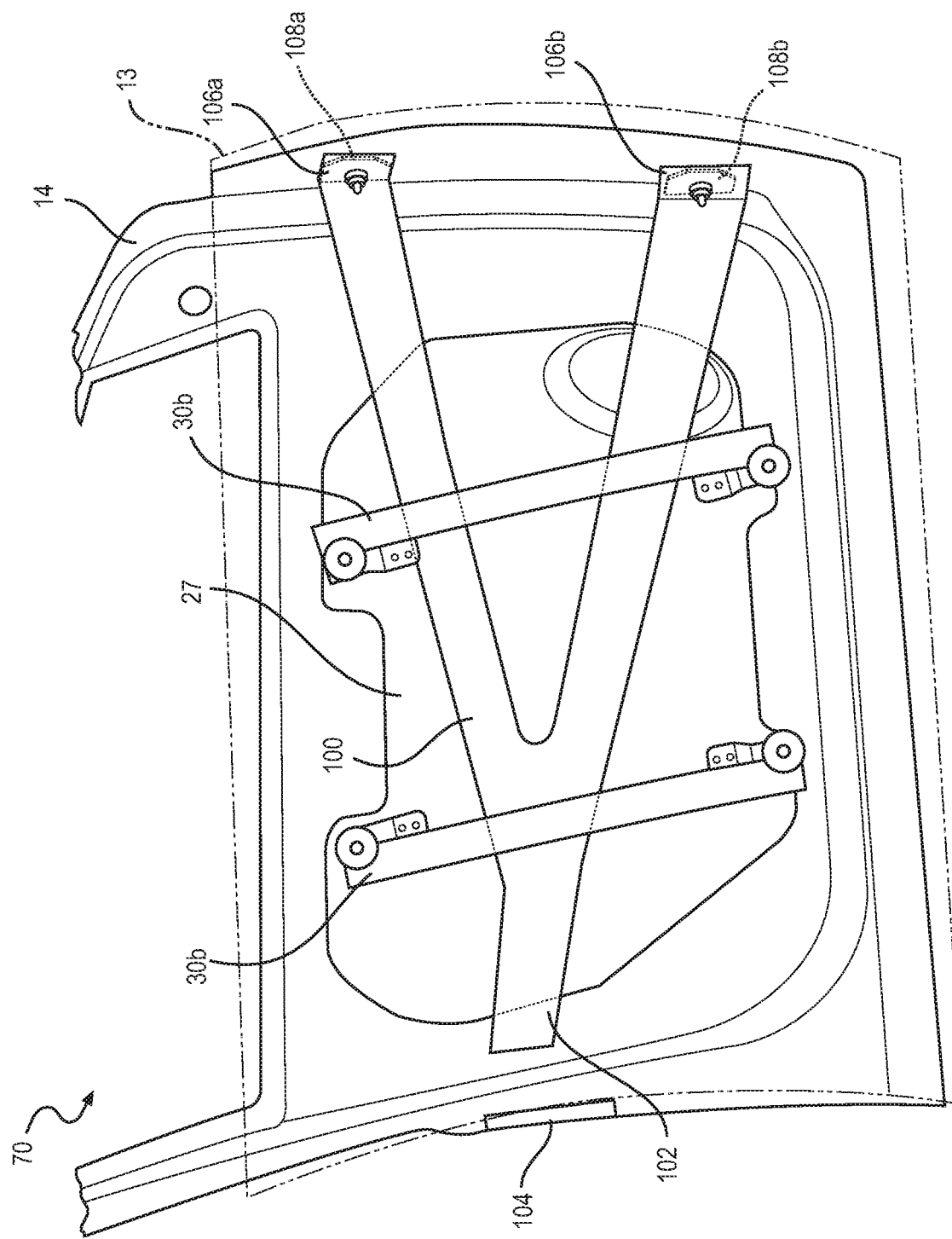
FIG. 9 shows a transparent side view of a carrier/intrusion member assembly.

FIG. 9 illustrates a door assembly 70 in accordance with another embodiment of the present invention in which the intrusion member, shown at 100, has one first or "latch" end 102 connected to a latch reinforcement structure and the latch, shown at 104, and two second or "hinged" ends 106a and 106b that connect to the hinge reinforcement structures and the hinges shown at 108a and 108b respectively.

Figure 10:
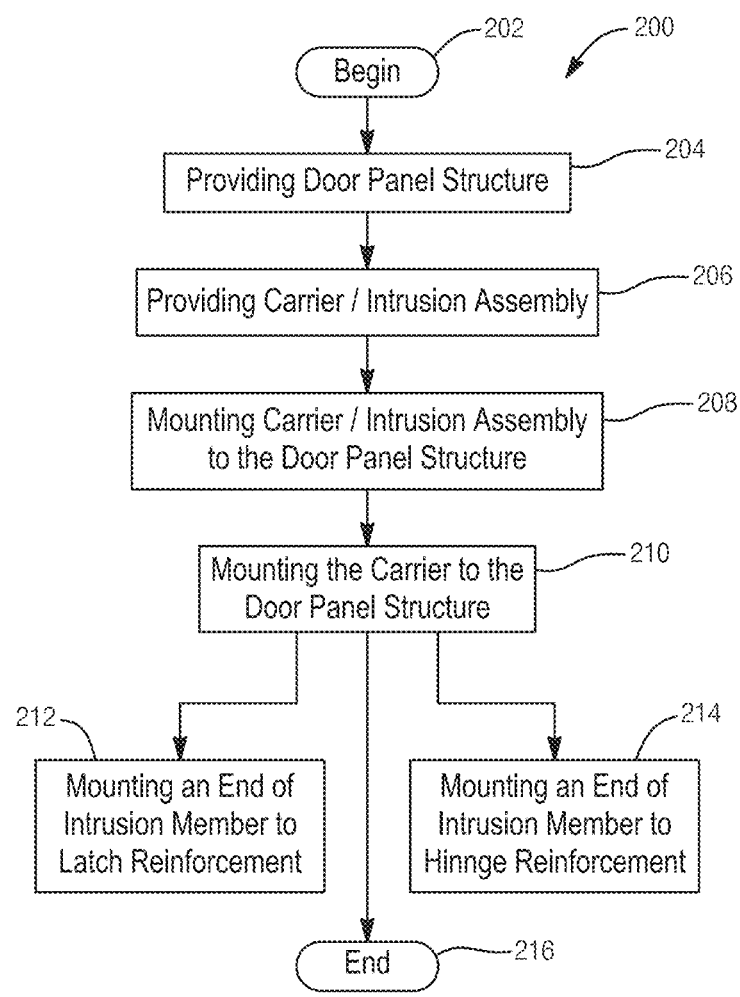
FIG. 10 is a flow diagram illustrating the steps or operations associated with a method for making the door assembly.

FIG. 10 illustrates a method 200 of making the door assembly 10, 70 in accordance with an embodiment of the present invention. The method 200 begins at 202. Step 204 includes providing a door panel structure, such as structure 18 and which includes an outer panel, such as outer panel 13 and an inner panel such as inner panel 14 connected together and together defining a door cavity, such as internal door cavity 20, between the inner and outer panels. Step 206 includes providing a carrier/intrusion member assembly, such as assembly 16, which includes a carrier such as carrier 27, an intrusion member (such as member 28) connected to the carrier, and a plurality of door hardware components (such as components 29 and 30) mounted to at least one of the carrier and the intrusion member. Step 208 includes mounting the carrier/intrusion member assembly to the door panel structure at least in part by mounting the intrusion member to the door panel structure. After step 208 the hardware components extend into the internal door cavity 20. The method 200 may further include step 210, which includes mounting the carrier to the door panel structure. Step 208 may optionally include step 212 which is mounting an end (i.e. a first end) of the intrusion member to the latch reinforcement structure. Alternatively or additionally, step 208 may optionally include step 214 which is mounting another end (i.e. a second end) of the intrusion member to the hinge reinforcement structure. Optionally, step 206 may include, providing the intrusion member, and overmolding the carrier over the intrusion member. The method ends at 216.

Optionally, the carrier and the intrusion member may together define a carrier/intrusion member cavity. The method 200 may further include step 218 which is providing an energy absorption material in the carrier/intrusion member cavity, which may entail providing a flowable material; injecting the flowable material into the carrier/intrusion member cavity; and hardening the flowable material to form the energy absorption material.

Figure 11:
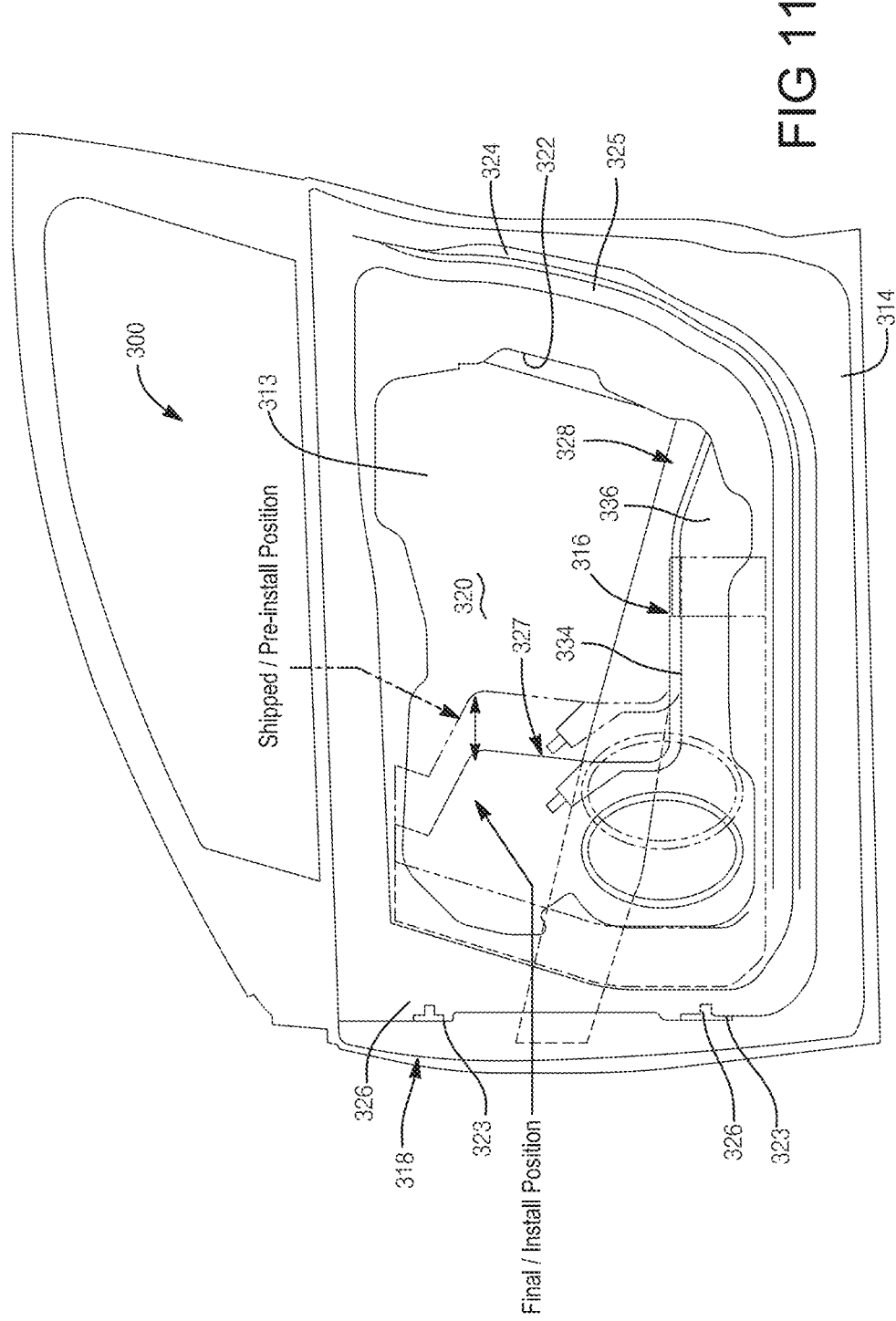
FIG. 11 is a transparent perspective view of a door panel structure associated with a vehicle door assembly and which is equipped with a collapsible carrier module constructed in accordance with the teachings of the present disclosure.
Figure 12:
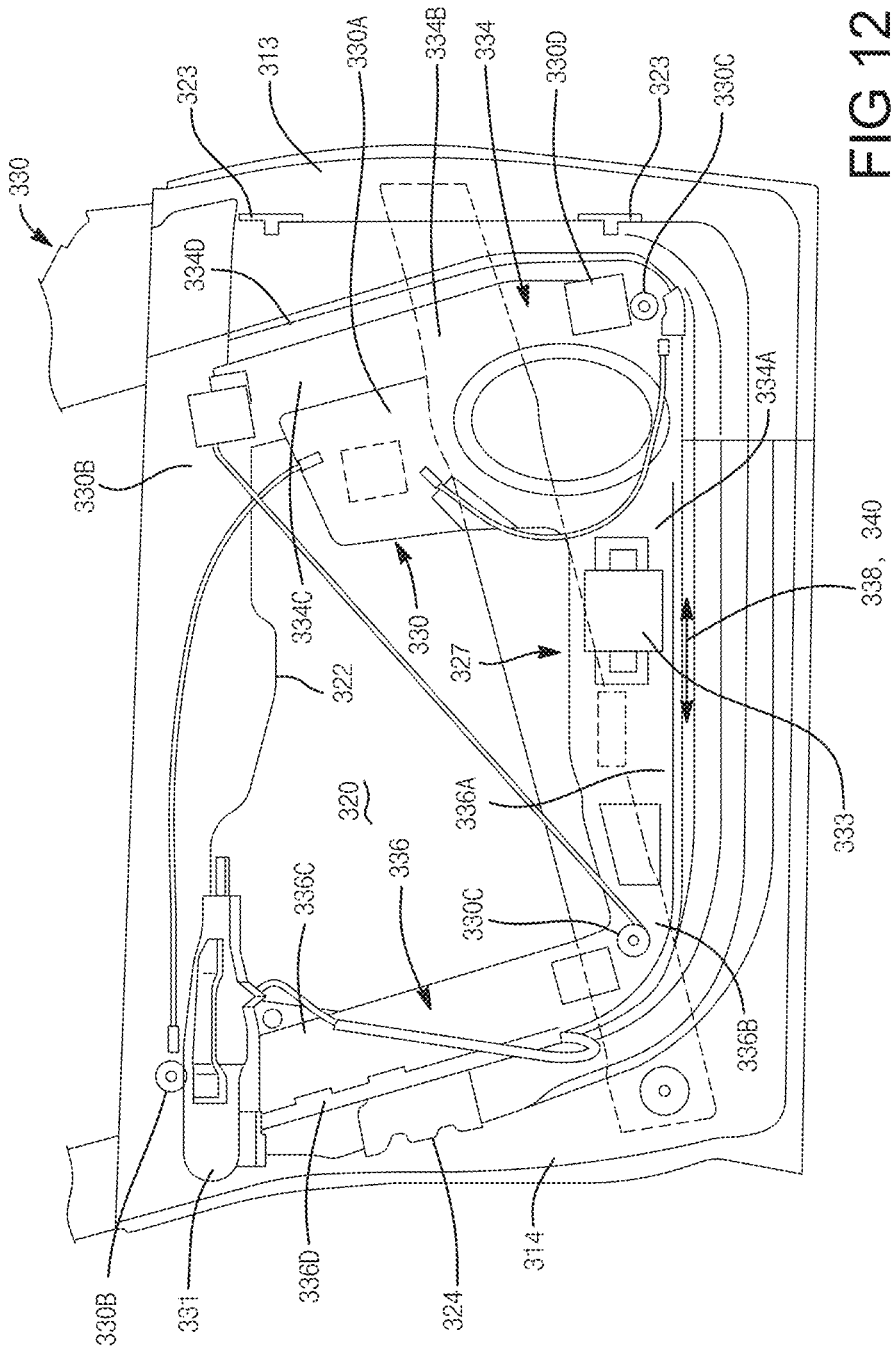
FIG. 12 is another transparent perspective view of the door structure illustrating a carrier plate associated with the collapsible carrier module mounted with door hardware components and powered systems.

Referring now to FIGS. 11 and 12, a door assembly 300 is illustrated which is configured to be mounted to body 11 of motor vehicle 12 (FIG. 1). Door assembly 300 includes an outer panel 313, an inner panel 314, an intrusion member 328 and a collapsible carrier module 316. The production of door assembly 300 is facilitated directly as a result of carrier module 316 including a collapsible carrier plate 327, the structure and function of which will be detailed with greater specificity hereinafter.

Outer panel 313 forms at least part of the exterior surface of door assembly 300. Inner panel 314 provides a structural member for the mounting of one or more trim pieces that form an inner surface of door assembly 300. Some of inner panel 314 may itself also form part of the inner surface of door assembly 300. The inner and outer panels are connected together and together form a door panel structure 318 that contains an internal door cavity 320. An opening 322 in door panel structure 318 provides access to internal door cavity 320.

Outer and inner panels 313 and 314 may be made from any suitable material or combination of materials. For example, outer and inner panels 313 and 314 may both be made from a suitable metal (e.g. a suitable steel). In another example, outer panel 313 may be made from a suitable polymeric or composite material (e.g. fiberglass) and the inner panel may be made from a suitable metal.

A pair of hinges 323 are connected to door panel structure 318 and pivotally mount the front end of door panel structure 318 (and door assembly 300) to vehicle body 11. A door latch 324 is mounted to the rear end of door panel structure 318 to permit the releasable closure of door assembly 300 against vehicle body 11. Hinges 323 and door latch 324 act as force transfer members through which forces in door assembly 300 are transmitted to vehicle 11. Such forces include, for example, side-impact forces from a vehicle colliding with the vehicle 12.

Referring primarily to FIG. 11, at least one of outer and inner panels 313 and 314 includes a latch reinforcement structure 325 that engages door latch 324 and transmits forces in door panel structure 318 thereto for transmission out of door assembly 300 and into vehicle body 11. Latch reinforcement structure 325 may simply be made up of a relatively thick metal plate that supports door latch 324. Similarly, at least one of outer and inner panels 313 and 314 includes a hinge reinforcement structure 326 that engages hinges 323 and transmits forces in door panel structure 318 thereto for transmission out of the door assembly 300 and into vehicle body 11. Hinge reinforcement structure 326 may simply be made up of one or more relatively thick metal plates that support hinges 323. Thus, side impact forces incurred by door assembly 300 can be transferred to vehicle body 11 through door latch 324 and hinges 323.

With particular reference to FIG. 12, carrier module 316 is shown to include a collapsible carrier plate 327 and a plurality of door hardware components 329 mounted to carrier plate 327. In this non-limiting example, door hardware 329 includes a power-operated window regulator 330 having an electric motor-driven cable driven (shown schematically at 330A), a pair of upper pulleys 330B and lower pulleys 330C, a pair of lifter plates 330D for moving a window (not shown) within a pair of glass run channels formed integrally as part of the window regulator rails associated with carrier plate 327. Other hardware components may include a speaker (not shown). An outside handle 331 mounted to door structure 318 is electrically and/or mechanically connected to latch 324. A door control unit 333 is shown mounted to a lower base segment of carrier plate 327 and controls operation of window lift actuator 330a and any power-operated actuator associated with latch 324.

In accordance with a non-limiting embodiment, carrier plate 327 is a two-piece panel assembly configured to hold a plurality of the aforementioned powered actuators and door hardware components and which is adapted to be installed within internal door cavity 320 via opening 322 formed in inner door panel 314 so that, upon installation, all attached hardware components are located in position for operation. Referring to FIGS. 11-14, carrier plate 327 is shown to generally include a first carrier member 334, a second carrier member 336 interconnected to first carrier member 334 via a sliding connection arrangement 338, and a locking mechanism 340 operably associated with connection arrangement 338. In particular, first carrier member 334 includes a first base segment 334A, a first body segment 334B, and a first window regulator rail segment 334C defining a first glass run channel 334D that is alignable along a first pillar (i.e. the A-pillar) of door structure 318. First rail segment 334C extends transversely with respect to first base segment 334A. Second carrier member 336 includes a second base segment 336A, a second body segment 336B, and a second window regulator rail segment 336C defining a second glass run channel 336D that is alignable with a second pillar (i.e. the B-pillar) of door structure 318. Second rail segment 336C extends transversely with respect to second base segment 336A.

Figure 13:
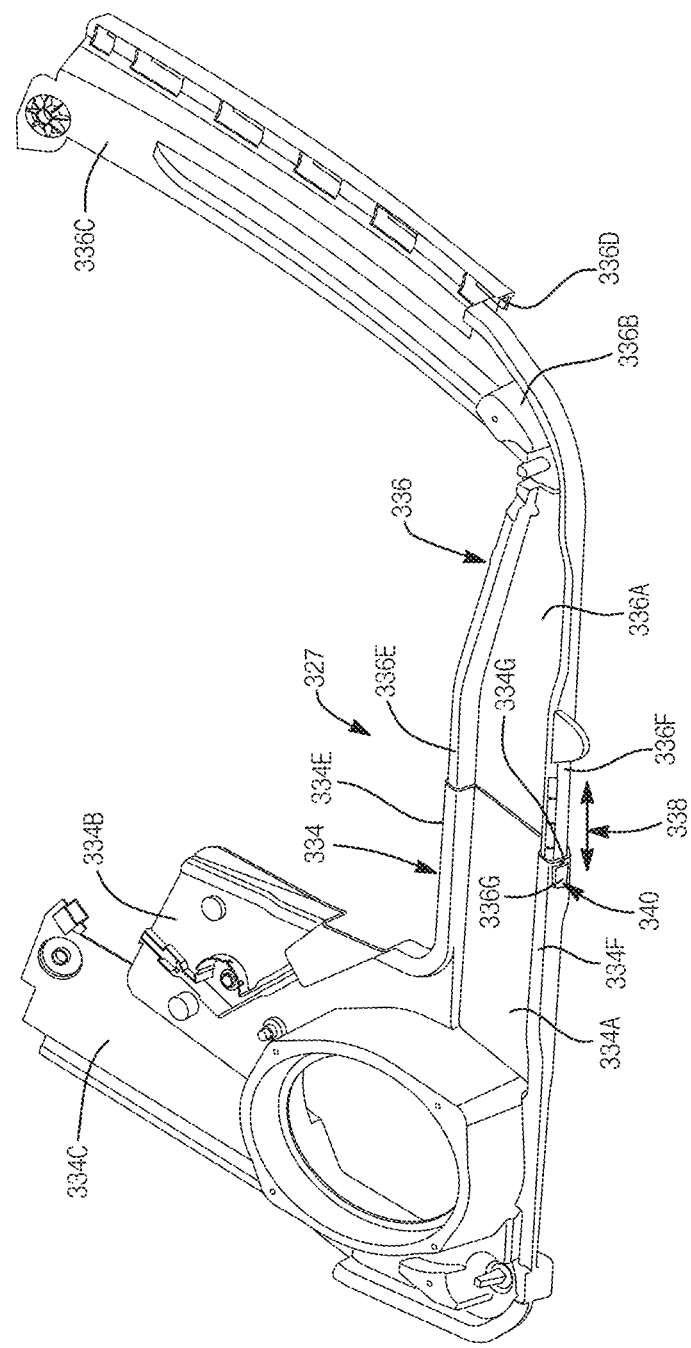
FIGS. 13 and 14 are perspective views of the carrier plate associated with the collapsible carrier module and illustrating its ability to move from a pre-installed collapsed configuration into a post-installed assembly configuration.
Figure 14:
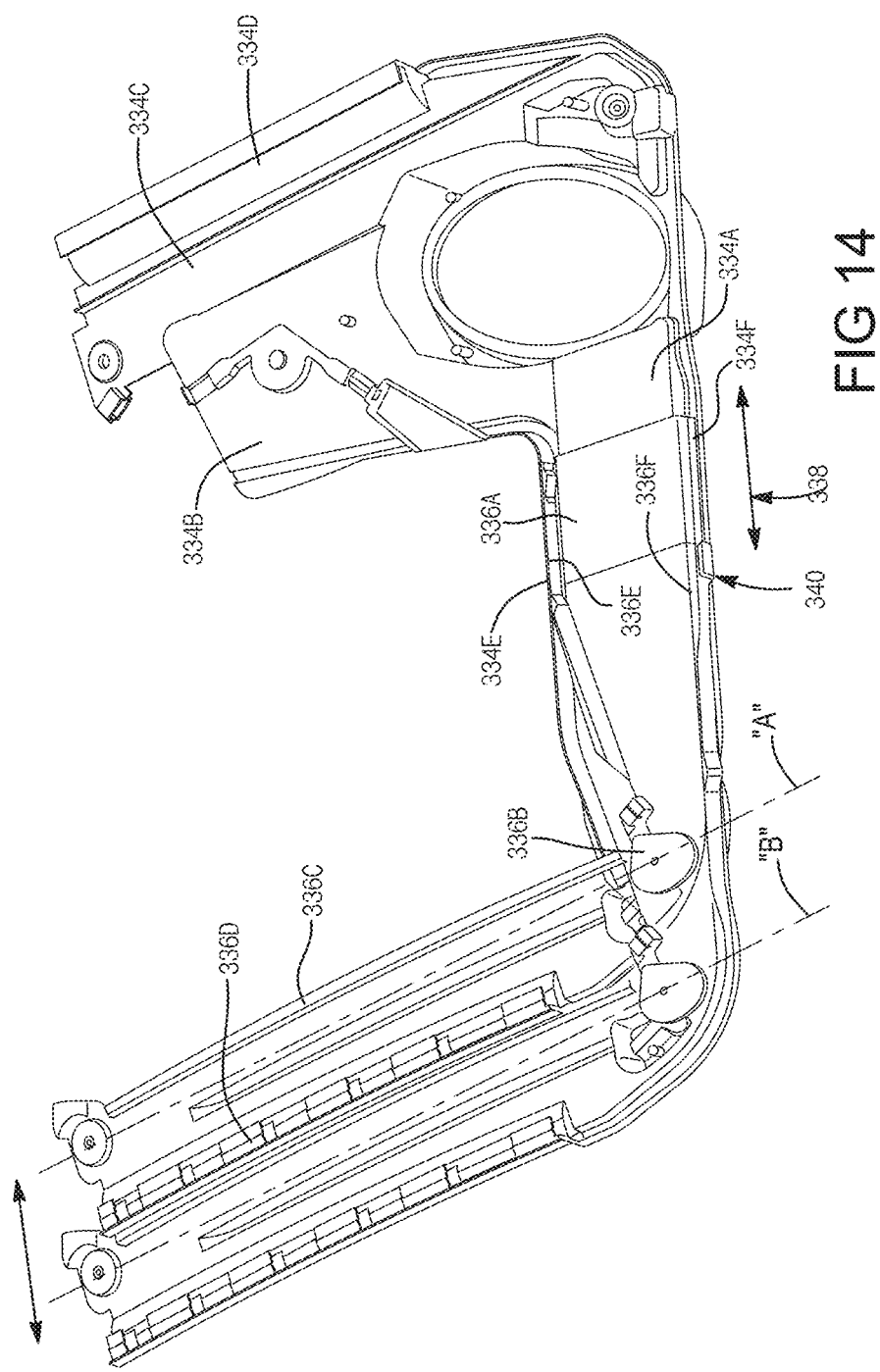

Referring primarily to FIGS. 13 and 14, collapsible carrier plate 327 is shown prior to assembly of the various door handwork components thereon and removed from cavity 320 of door assembly 300 to better illustrate its structure and features. FIG. 13 illustrates carrier plate 327 from a "dry-side" view (looking from inside of door assembly 300), while FIG. 14 illustrates carrier plate 327 from a "wet side" view (looking from outside of door assembly 300). First base segment 334A and second base segment 336a are interconnected via sliding connection arrangement 338 to permit relative movement therebetween between a first or retracted position and a second or extended position. The retracted position established between first and second carrier members 334, 336 of carrier plate 327 is best identified by line "A" in FIG. 14. In contrast, the extended position established between the first and second carrier members 334, 336 of carrier plate 327 is best illustrated by line "B" in FIG. 14.

FIG. 13 illustrates carrier plate 327 in its extended position such that locking mechanism 340 interacts with sliding connection arrangement 338 so as to establish a rigid coupling (i.e. axial retention feature) between first base segment 334A and second base segment 336A, thereby preventing subsequent axial movement toward the retracted position. With carrier plate 327 in its retracted position, a pre-installed/collapsed configuration is established for carrier module 316 which facilitates installation thereof into internal door cavity 320 through door opening 322. Following installation within internal door cavity 320, carrier plate 327 is moved into its extended position to establish a post-installed/assembled configuration. Thereafter, portions of each carrier member 334, 336 are securely fastened (i.e. via rivets, fasteners, etc.) to complementary portions of inner panel 314 and/or portions of door panel structure 318. This installed arrangement is best shown in FIG. 12.

Sliding connection 338 is best seen in FIG. 13 to include a pair of elongated guide tubes 334E, 334F formed along opposite lateral edges of first base segment 334A and which are adapted to slideably receive a corresponding pair of edge rails 336E, 336F formed along opposite lateral edges of second base segment 336A to provide a telescopic relationship therebetween. Locking mechanism 340 includes, in this non-limiting example, a pair of cam tabs 336G each formed to extend outwardly from a corresponding one of edge rails 336E, 336F and which are configured to "snap" into retention windows 334G formed in guide tubes 334E, 334F.

Thus, once carrier members 334, 336 are located with carrier plate 327 in its extended position, engagement of tabs 336G in retention windows 334G prevents further axial movement in either of an extension or retraction direction. Obviously, the present disclosure contemplates any type of equivalent sliding connection arrangement and locking mechanism capable of providing the above-described features and function. As will also be noted, first body segment 334B of first carrier member 334 provides a speaker mount tube and mounting structure for one for of the lower pulleys 330C and window regulator actuator 330A. Integrated first window regulator rail segment 334C of first carrier member 334 provides a mounting for one of the upper pulleys 330B and further defines elongated first glass run channel 334D along its outboard edge. Similarly, second body segment 336B of second carrier member 336 provides a mount for the other one of the lower pulleys 330C while second window regulator rail segment 336C defines a mount for the other one of the upper pulleys 330B as well as defines elongated second glass run channel 336D along its outboard edge. While not shown, channel seals would be installed in each of elongated glass run channels 334D, 336D and provide a seal relative to the window (not shown) mounted therein. Glass run channels 334D, 336D are each configured as C-shaped open guide channels to facilitate movement of the window between its open and closed positions.

Figure 15:
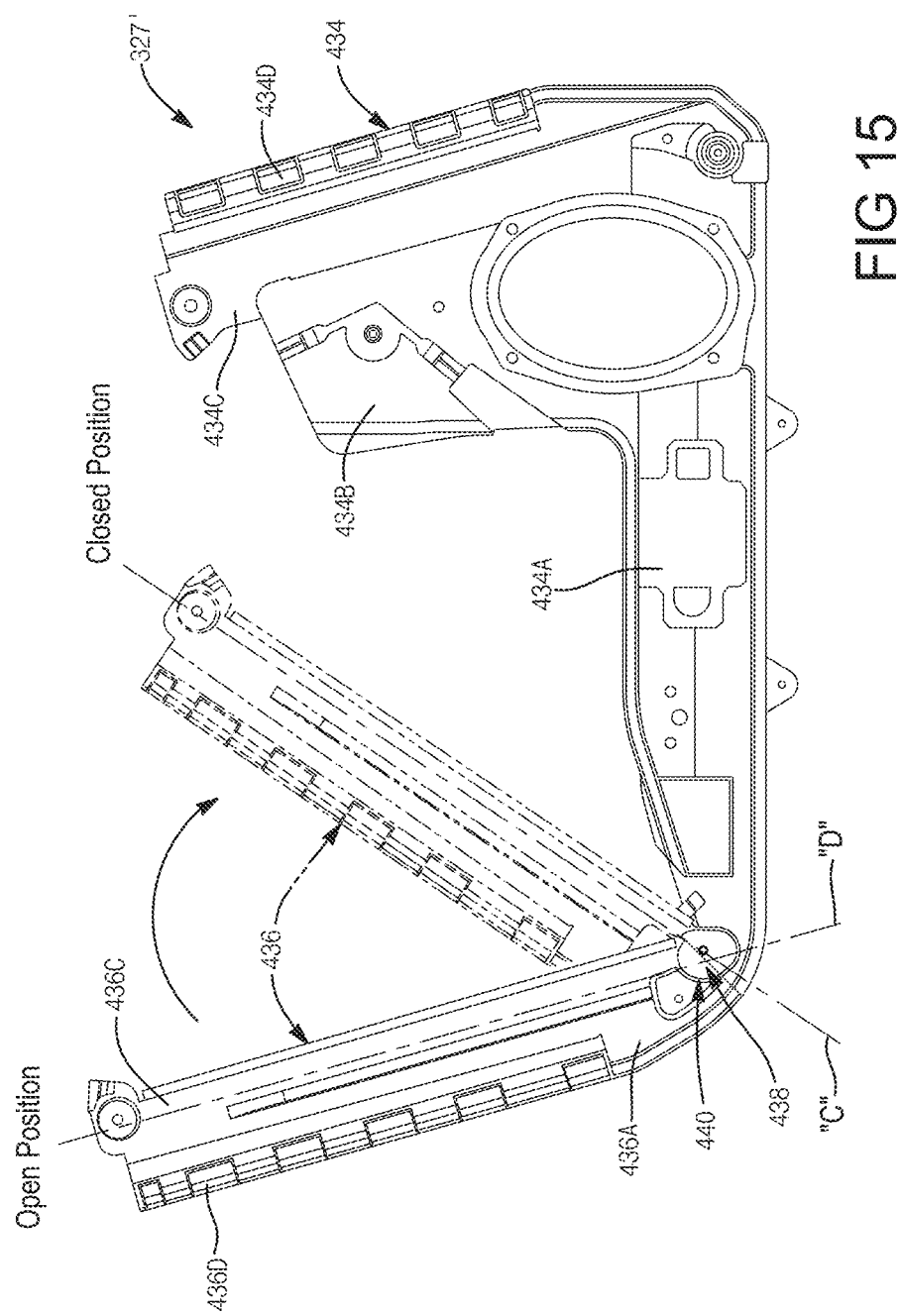
FIGS. 15 and 16 are perspective views of an alternative version of a carrier plate associated with the collapsible carrier module of the present disclosure and illustrating its ability to move from a pre-installed collapsed configuration into a post-installed assembly configuration.
Figure 16:
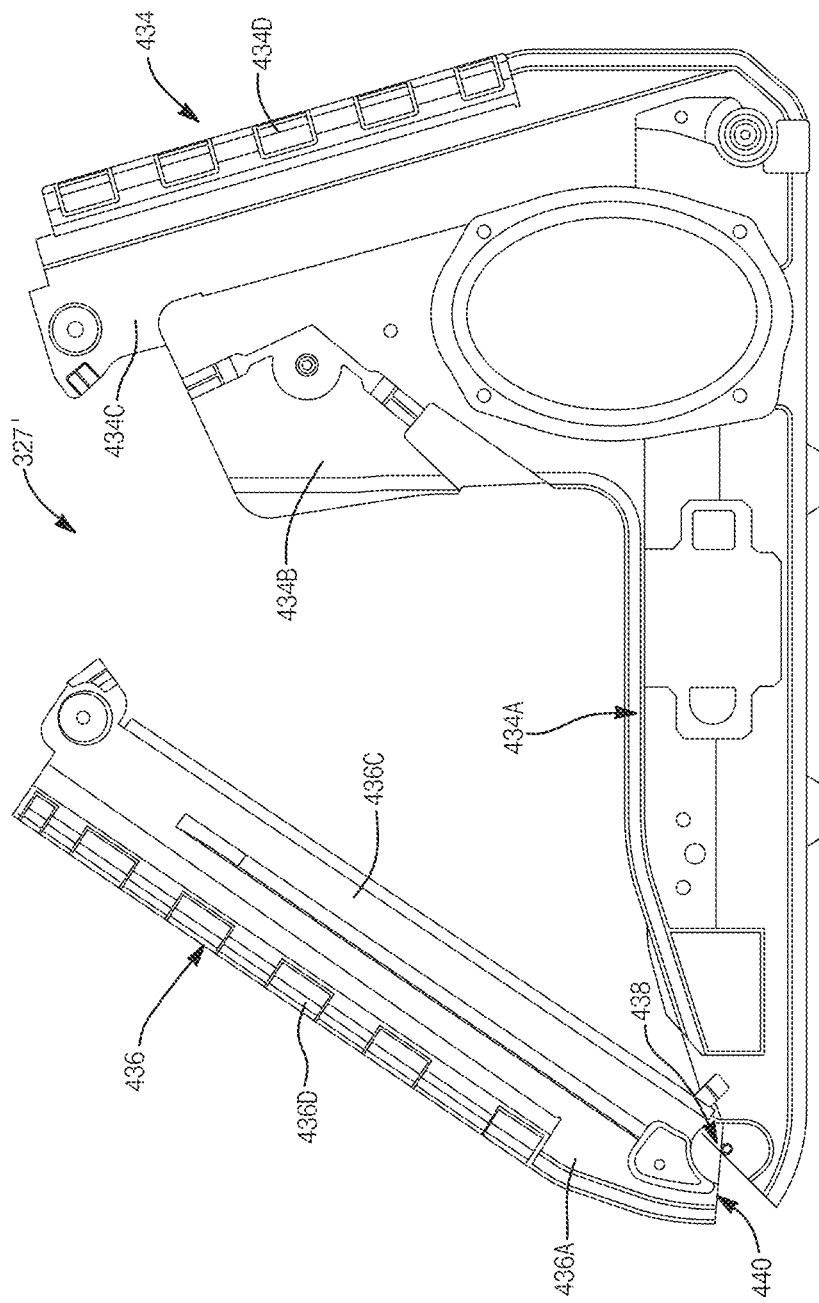

With particular reference now to FIGS. 15 and 16, an alternative embodiment of a collapsible carrier plate 327A is illustrated and which can be substituted for carrier plate 327 for installation with a carrier module 316A within internal cavity 320 of door 300. In general, carrier plate 327A is configured to utilize a pivotable movement instead of a translational movement between a pair of carrier members to establish the pre-installed/collapsed arrangement as well as the post-installed/assembled arrangement. In particular, carrier plate 327A is configured to generally include a first carrier member 434, a second carrier member 436 interconnected to first carrier member 434 via a hinged-pivot connection arrangement 438, and a locking mechanism 440 operably associated with pivot connection arrangement 438. First carrier member 434 includes a first base segment 434A, a first body segment 434B, and a first window regulator rail segment 434C having a first glass run channel 434D that is alignable with a first pillar (i.e. the A-pillar) of door structure 318. Second carrier member 436 includes a second base segment 436A and a second window regulator rail segment 436C having a second glass run channel 436D that is alignable with a second pillar (i.e. the B-pillar) of door structure 318.

First base segment 434A and second base segment 436A are interconnected via hinged-pivot connection 438 to permit relative rotational movement therebetween so as to permit second rail segment 436C to move relative to first base segment 434A between a first or closed position and a second or open position. The closed position is identified in FIG. 15 via line "C" while the open position is identified via line "D". Location of second rail segment 436C in its closed position relative to first base segment 434A establishes the pre-installed/collapsed arrangement for collapsible carrier plate 327A. In contrast, location of second rail segment 436C in its open position relative to first base segment 434A establishes the post-installed/assembled arrangement for collapsible carrier plate 327A. A snap-lock locking mechanism is shown schematically by block 440 but is intended to identify any suitable locking mechanism operable to latch second rail segment 436C in its open position following installation into door cavity 320 via opening 322. The remaining structure and function of carrier 327A is generally similar to that of carrier 327 previously described in detail.

As noted, FIGS. 12-14 illustrate a first version of a collapsible carrier plate 327 utilizing a sliding connection arrangement 338 and a locking mechanism 340 to move first and second carrier members 334, 336 axially between retracted and extended position. Likewise, FIGS. 15-16 illustrate a second version of a collapsible carrier plate 327A utilizing a hinged-pivot connection arrangement 438 and a locking mechanism 440 for facilitating pivotal movement of second carrier member 436 relative to first carrier member 434 between open and closed positions. While collapsible carrier plate 327 of FIGS. 12-14 includes two distinct carrier members 334, 336 interconnected via a telescopic-type sliding connection 338, collapsible carrier plate 327A of FIGS. 15 and 16 may include either individual carrier members 434, 436 connected via a pivot-type connection 438 or carrier members 434', 436' formed as a unitary component and utilizing an integral hinge-type connection 438' therebetween. It should also be recognized by those skilled in the art that a third or "hybrid" version of a two-member carrier plate can utilize a sliding connection and first locking mechanism to interconnect base segments of first and second carrier members for axial relative movement and a hinged-pivot connection and second locking mechanism to interconnect the base segment of the second carrier member to a rail segment of the second carrier member to provide another collapsible carrier module embodiment. The combination of both axial and pivotal movements between portions of the two-member carrier plate provides further opportunity to utilize collapsible carrier modules in smaller door assemblies.

Figure 17:
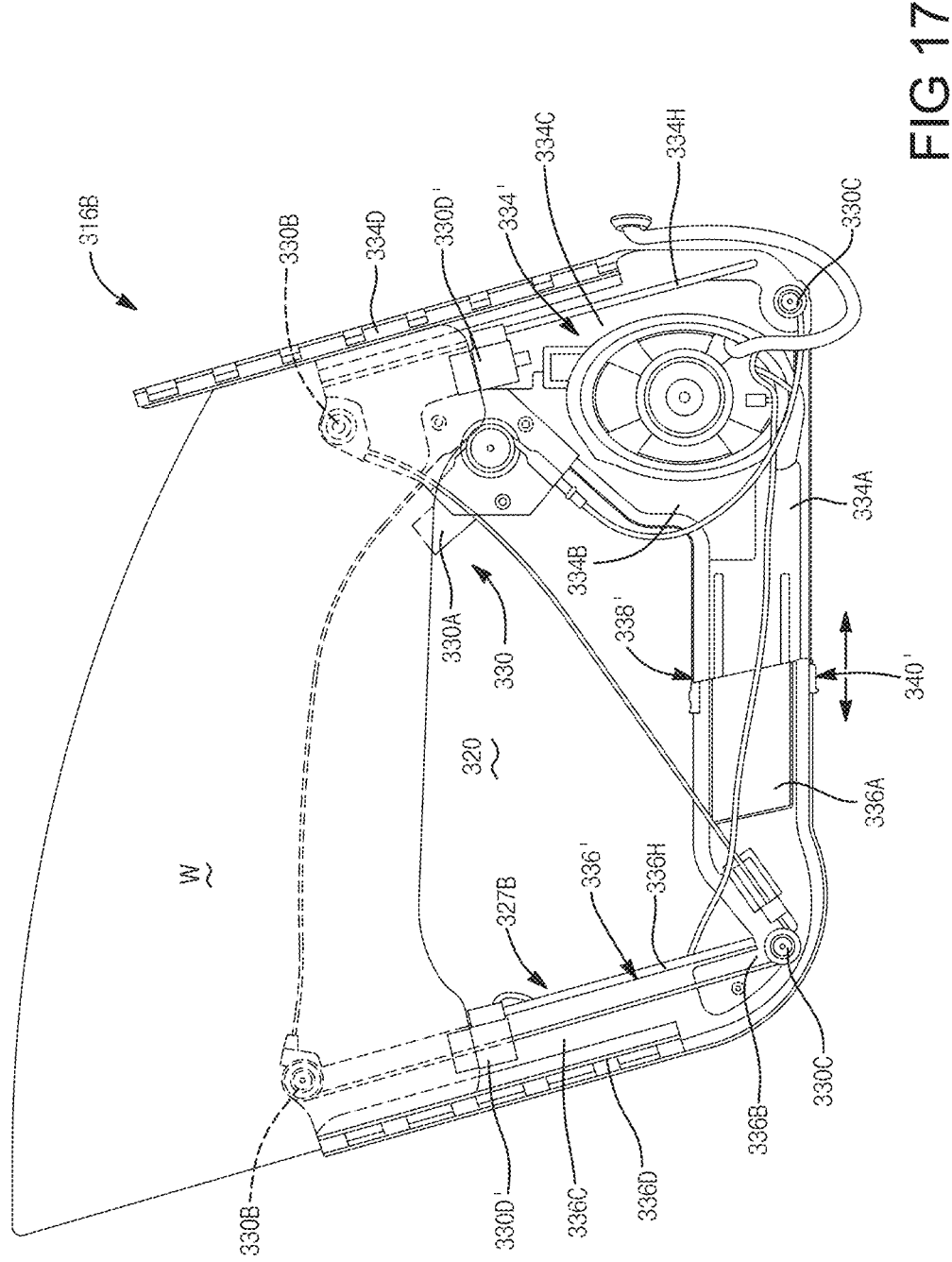
FIG. 17 is a perspective view of an alternative embodiment of the collapsible carrier module equipped with a two-piece carrier plate assembled to include an integrated power window lift system configured for moving the window between open and closed positions.

Referring now to FIGS. 17-21, another embodiment of a collapsible carrier module 316B for installation in door assembly 300 is disclosed. FIG. 17 shows collapsible carrier module 316B to include a two-piece carrier plate 327B equipped with many of the same components (i.e. door hardware, power-operated window regulator, latch, etc.) associated with two-piece carrier plate 327 shown in FIG. 12. In this regard, common reference numerals are used hereinafter to identify previously disclosed components. Two-piece carrier plate 327B is generally similar to carrier plate 327 of FIGS. 12-14 and is shown to now include a first carrier member 334', a second carrier member 336' connected to first carrier member 334' via a sliding connection arrangement 338', and a locking arrangement 340'. However, two-piece carrier plate 327B has been modified to include a pair of laterally-spaced integrated window regulator rail features in addition to glass run channels 334D and 336D.

First carrier member 334' includes a first base segment 334A, a first body segment 334B, and a first window regulator rail segment 334C defining a first glass run channel 334D and a first slider rail 334H which are both alignable along a first pillar (i.e. the A-pillar) of door structure 318 of door assembly 300. First slider rail 334H is an elongated, raised projection extending outwardly from first window regulator rail segment 334C of first carrier member 334'. First slider rail 334H is configured to support a first one of a pair of window lifter plates 330D' for sliding translational movement required for moving the window W between its open and closed positions. Second carrier member 336' includes a second base segment 336A, a second body segment 336B, and a second window regulator rail segment 336C defining a second glass run channel 336D and a second slider rail 336H which are both alignable with a second pillar (i.e. the B-pillar) of door structure 318. Second slider rail 336H is an elongated, raised projection extending from an edge surface of second window regulator rail segment 336C of second carrier member 336'. Second slider rail 336H is configured to support a second one of the pair of window lifter plates 330D' for sliding translational movement required for moving window W between its open and closed positions. As seen, each of window lifter plates 330D' are attached via cables, routed around one or more of pulleys 330C, 330B to a drum (now shown) that is rotated via actuation of power-operated window lift actuator 330A.

Figure 19:
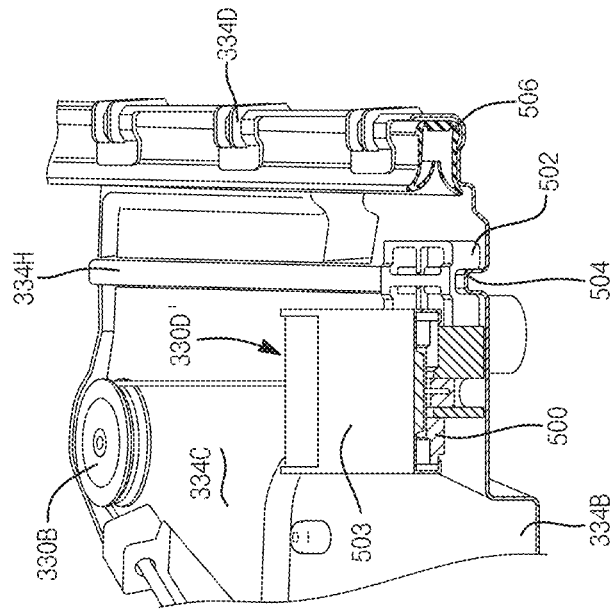
FIG. 19 is an enlarged, partially sectioned, view taken from FIG. 18 and illustrating a first guided lift plate/slider arrangement associated with the window regulator mechanism.
Figure 18:
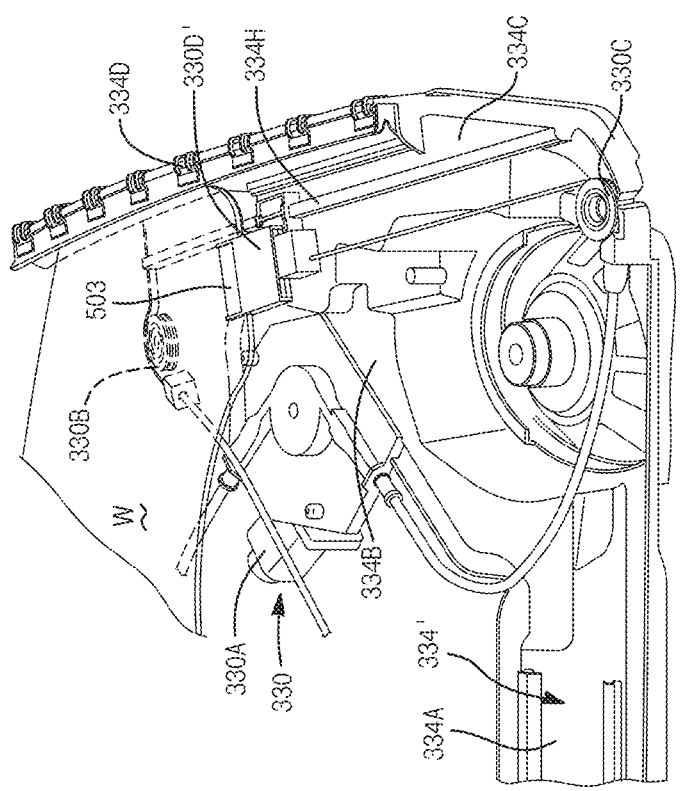
FIG. 18 is a partial perspective view of a first carrier member associated with the two-piece carrier plate shown in FIG. 17 and which illustrate various components of a window regulator mechanism associated with the integrated power window lift system.

Referring particularly to FIGS. 18 and 19, portions of first carrier member 334' are shown to better illustrate the configuration of first slider rail 334H and first glass run channel 334D formed in first widow regulator rail segment 334C. As seen, first window lifter plate 330D' includes a first body section 500 and a second body section 502. First body section 500 supports a first window retainer 503 which, in turn, holds a first portion of window W. First body section 500 is configured to receive and retain end portions of a suitable cable drive system associated with power-operated window regulator 330. Second body section 502 defines a guide channel 504 aligned to surround the upper and both lateral side surfaces of first slider rail 334H. Note that a first window seal 506 is retained in first glass run channel 334D and functions to retain a first side edge of window W therein for low friction sliding movement.

Figure 20:
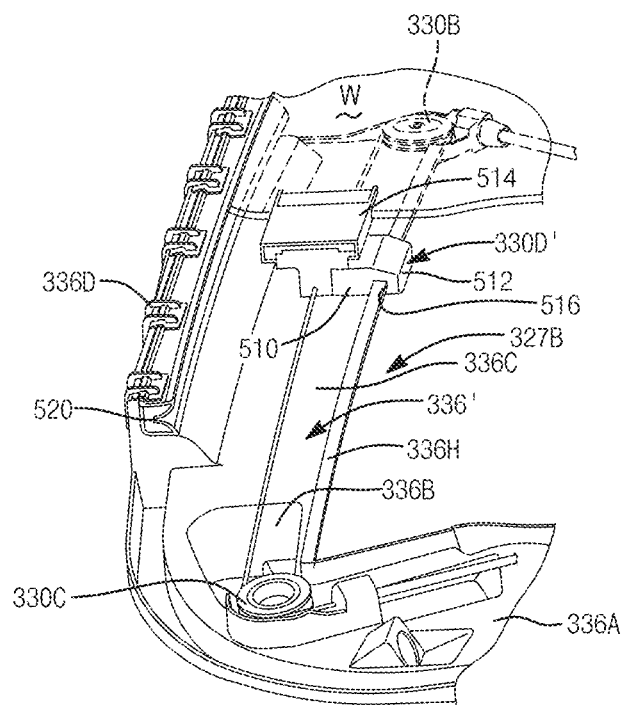
FIG. 20 is a partial perspective view of a second carrier member associated with the two-piece carrier plate shown in FIG. 17 and which illustrates various other components of the window regular mechanism.
Figure 21:
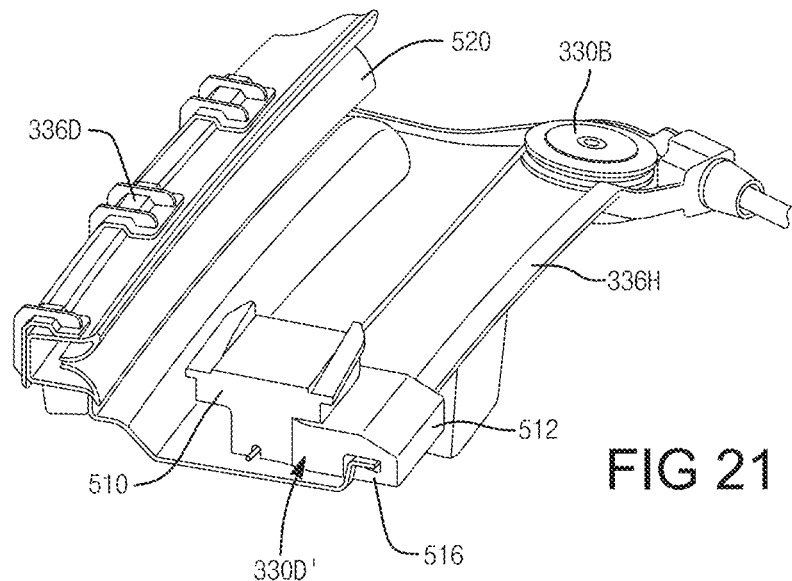
FIG. 21 is an enlarged, partially sectioned, view taken from FIG. 20 and illustrating a second guided lift plate/slider arrangement associated with the window regulator mechanism.

Referring particularly to FIGS. 20 and 21, portions of second carrier member 336' are shown to better illustrate the configuration of second slider rail 336H and second glass run channel 336D formed in second window regulator rail segment 336C. As seen, second window lifter plate 330D' includes a first body section 510 and a second body section 512. A second window retainer 514 is secured to first body section 510 and holds a second portion of window W. First body section 510 is configured to receive and retain portions of the cable drive system associated with power-operated window regulator 330. Second body section 512 defines a L-shaped guide channel 516 aligned to surround second slider rail 336H. Note that a second window seal 520 is retained in second glass run channel 336D and retains a second side edge of window W therein for low friction sliding movement. The "integration" of the first and second slider rails into two-piece carrier plate 327B provides an arrangement for directly supporting the window lifter plates of the window regulator assembly. While each of the first and second slider rails is shown with a different profile, it is understood that any rail feature providing a window guiding and support function is within the scope of the present disclosure.

Figure 22:
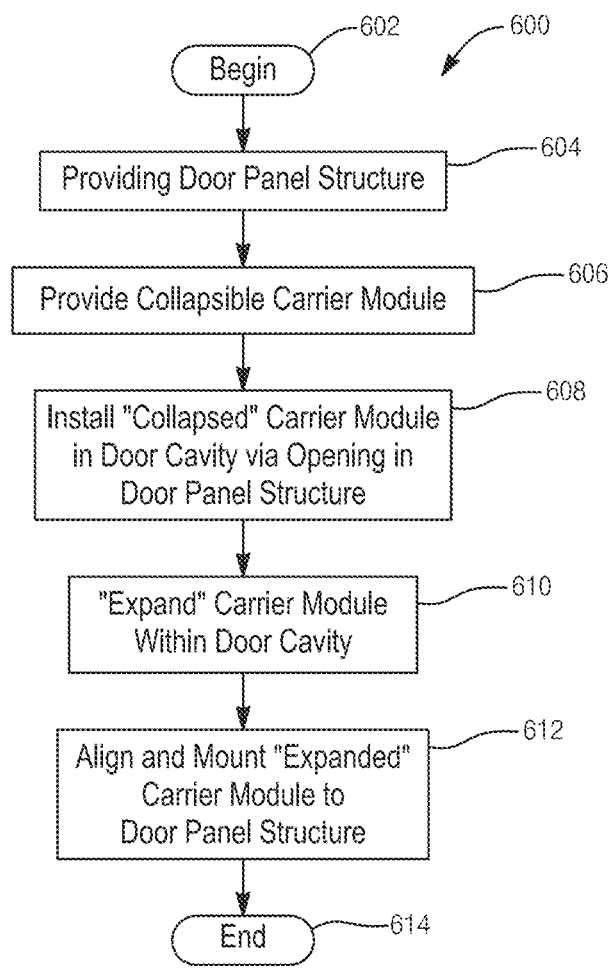
FIG. 22 is a flow diagram illustrative of a method of making a door assembly in accordance with the present disclosure.

FIG. 22 illustrates a method 600 for assembly of a door assembly 300 equipped with one of the collapsible carrier modules of the present disclosure. The method begins at step 602. Step 604 includes providing door panel structure 318 having outer panel 313 and inner panel 314 connected together to define an internal cavity 320 and an access opening 322. Step 606 includes providing a collapsible carrier module 316, 316A, 316B having a two-member carrier plate 327, 327A, 327B. Step 608 includes installing the carrier module in its pre-installed/collapsed orientation into door cavity 320 through opening 322. Step 610 includes expanding the carrier module within door cavity 320 from its pre-installed/collapsed orientation into a post-installed/assembled orientation and engaging the locking mechanism(s). Step 612 includes aligning the carrier module and rigidly mounting the carrier module to door panel structure 318. The method ends at step 614.

The present disclosure provides a first embodiment of a collapsible carrier plate 327 (FIGS. 11-14), a second embodiment of a collapsible carrier plate 327A (FIGS. 15-16), and a third embodiment of a collapsible carrier plate 372B, each of which respectively rely on at least one of a translational movement and a rotational movement to provide a collapsible carrier module capable of being installed through an opening in the inner door panel for subsequent expansion prior to mounting within the door cavity. Those skilled in the art will recognize that the present disclosure includes a third embodiment which integrates both the translational version and the rotational version into a common arrangement. In such a configuration, the second base segment of the second carrier member would be moveable axially relative to the first base segment of the first carrier member and secured in its axially extended position via a first locking mechanism. Additionally, the second rail segment of the second carrier member would be pivotably connected to the second base segment and rotatably moveable relative thereto and secured in its open position via a second locking mechanism. Such a combination sliding and rotationally collapsible configuration would provide the ability to install the carrier module in tighter door packaging environments.

While the above description constitutes a plurality of embodiments of the present invention, it will be appreciated that the present invention is susceptible to further modification and change without departing from the fair meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A door assembly for a vehicle, comprising:
an outer panel;
an inner panel connected to the outer panel to form a door panel structure defining an internal door cavity between the inner and outer panels; and
a collapsible carrier module having a carrier plate, the carrier plate configured to move between a collapsed arrangement for installation into the internal door cavity through an opening in the inner panel and an expanded arrangement within the internal door cavity to facilitate mounting of the carrier module to the door panel structure within the internal door cavity;
wherein the carrier plate is directly securable to an inner surface of the inner panel to facilitate mounting of the carrier module to the door panel structure;
wherein the carrier plate includes a first base segment and a second base segment having a sliding connection therebetween, where a length of the carrier plate in the expanded arrangement is greater than a length of the carrier plate in the collapsed arrangement.

2. The door assembly of claim 1 wherein the carrier plate includes a first carrier member having the first base segment connected to a second carrier member having the second base segment a connection mechanism permitting relative movement therebetween from a first position defining the collapsed arrangement and a second position defining the expanded arrangement.

3. The door assembly of claim 2 wherein the connection mechanism is the sliding connection configured to permit translational movement between the first and second carrier members.

4. The door assembly of claim 3 wherein the sliding connection is established between the first base segment of the first carrier member and the second base segment of the second carrier member, and wherein a locking mechanism is operable to hold the interconnected base segments when the carrier members are located in the second position.

5. The door assembly of claim 4 wherein the first carrier member includes a first rail segment extending transversely from the first base segment and which define a first glass run channel, wherein the second carrier member includes a second rail segment extending transversely from the second base segment and which defines a second glass run channel, and wherein the first and second glass run channels are configured to support a door window therein for movement between open and closed positions.

6. The door assembly of claim 5 wherein the first rail segment of the first carrier member further includes a first slider rail for supporting a first window lifter plate for translational movement thereon, and wherein the second rail segment of the second carrier member further includes a second slider rail for supporting a second window lifter plate for translational movement thereon.

7. A collapsible carrier plate configured to be installed in a door assembly for a motor vehicle comprising: inner and outer panels defining a door panel structure with an opening in the inner panel extending into an internal door cavity, the collapsible carrier plate comprising:
 a first carrier member connected to a second carrier member via a connection mechanism for movement between a first position defining a collapsed arrangement for the carrier plate and a second position defining an expanded arrangement for the carrier plate, the carrier plate operable in its collapsed arrangement to permit installation through the opening in the inner door panel into the internal door cavity and in its expanded arrangement to permit mounting within the internal cavity, wherein the carrier plate is directly securable to an inner surface of the inner panel to facilitate mounting of the carrier plate to the door panel structure; and
 a locking mechanism for holding the first carrier member in its second position relative to the second carrier member;
 wherein the first carrier member and the second carrier member have a sliding connection therebetween, where a length of the carrier plate in the expanded arrangement is greater than a length of the carrier plate in the collapsed arrangement.

8. The collapsible carrier plate of claim 7 wherein the connection mechanism is the sliding connection configured to permit translational movement between the first and second carrier members.

9. The collapsible carrier plate of claim 8 wherein the sliding connection is established between a first base segment of the first carrier member and a second base segment of the second carrier member, and wherein the locking mechanism is operable to hold the interconnected base segments when the carrier members are located in the second position.

10. The collapsible carrier plate of claim 9 wherein the first carrier member includes a first rail segment extending transversely from the first base segment and which define a first glass run channel, wherein the second carrier member includes a second rail segment extending transversely from the second base segment and which defines a second glass run channel, and wherein the first and second glass run channels are configured to support a door window therein for movement between open and closed positions.

11. The collapsible carrier plate of claim 10 wherein the first rail segment of the first carrier member further includes a first slider rail for supporting a first window lifter plate for translational movement thereon, and wherein the second rail segment of the second carrier member further includes a second slider rail for supporting a second window lifter plate for translational movement thereon.

\* \* \* \* \*